(12) United States Patent
Hayashide et al.

(10) Patent No.: US 6,507,444 B2
(45) Date of Patent: *Jan. 14, 2003

(54) IMAGING LENS AND IMAGE READING APPARATUS USING IT

(75) Inventors: Tadao Hayashide, Yokohama (JP); Kazuyuki Kondo, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,760

(22) Filed: Sep. 24, 1999

(65) Prior Publication Data

US 2002/0163739 A1 Nov. 7, 2002

(30) Foreign Application Priority Data

Oct. 2, 1998 (JP) .............................. 10-296053
May 7, 1999 (JP) .............................. 11-126948

(51) Int. Cl.$^7$ .......................... G02B 3/02; G02B 17/00; G02B 27/14
(52) U.S. Cl. .................. 359/720; 359/729; 359/631
(58) Field of Search ................................. 359/720, 631, 359/633, 729, 364, 365, 366, 727, 724

(56) References Cited

U.S. PATENT DOCUMENTS

| | | | |
|---|---|---|---|
| 4,278,999 A | * 7/1981 | Ganguly et al. | 358/213 |
| 4,536,084 A | 8/1985 | Tokuhara | 355/55 |
| 4,606,607 A | 8/1986 | Kurihara | 359/715 |
| 5,016,977 A | 5/1991 | Baude et al. | 359/570 |
| 5,179,465 A | 1/1993 | Kondo | 359/218 |
| 5,331,343 A | * 7/1994 | Ono et al. | 346/108 |
| 5,726,792 A | 3/1998 | Iizuka | 359/205 |
| 5,770,847 A | * 6/1998 | Olmstead | 235/462 |
| 5,917,662 A | * 6/1999 | Sekita | 359/729 |

FOREIGN PATENT DOCUMENTS

| | | |
|---|---|---|
| EP | 0836110 | 4/1998 |
| GB | 2266785 | 11/1993 |
| JP | 60-117227 | 6/1985 |
| JP | 1-137217 | 5/1989 |
| JP | 3-125107 | 5/1991 |
| JP | 5-14602 | 1/1993 |
| JP | 7-221944 | 8/1995 |
| JP | 9-43508 | 2/1997 |

OTHER PUBLICATIONS

Patent Abstracts of Japan, vol. 009, No. 269, Oct. 26, 1985 (JP–60–117227).
Patent Abstracts of Japan, vol. 1995, No. 11, Dec. 26, 1995 (JP–07–221944).
Patent Abstracts of Japan, vol. 015, No. 335, Aug. 26, 1991 (JP–03–125107).
Patent Abstracts of Japan, vol. 013, No. 389, Aug. 29, 1989 (JP–01–137217).
Patent Abstracts of Japan, vol. 1997, No. 6, Jun. 30, 1997 (JP–09–043508).
Patent Abstracts of Japan, vol. 17, No. 287 (E–1374) (JP 05–014602, Jan. 22, 1993), Jun. 2, 1993.
Patent Abstracts of Japan, vol. 9, No. 269 (P–400) (JP 60–117227, Jun. 24, 1985), Oct. 26, 1985.
Patent Abstracts of Japan, vol. 1995, No. 11 (JP 7–221944, Aug. 18, 1995), Dec. 26, 1995.

* cited by examiner

Primary Examiner—Georgia Epps
Assistant Examiner—Tim Thompson
(74) Attorney, Agent, or Firm—Fitzpatrick, Cella, Harper & Scinto

(57) ABSTRACT

An imaging lens is used in image reading and adapted to image information of an original on a reading device. In the imaging lens at least one surface out of a plurality of surfaces forming the imaging lens has refracting power rotationally asymmetric with respect to the optical axis.

71 Claims, 17 Drawing Sheets

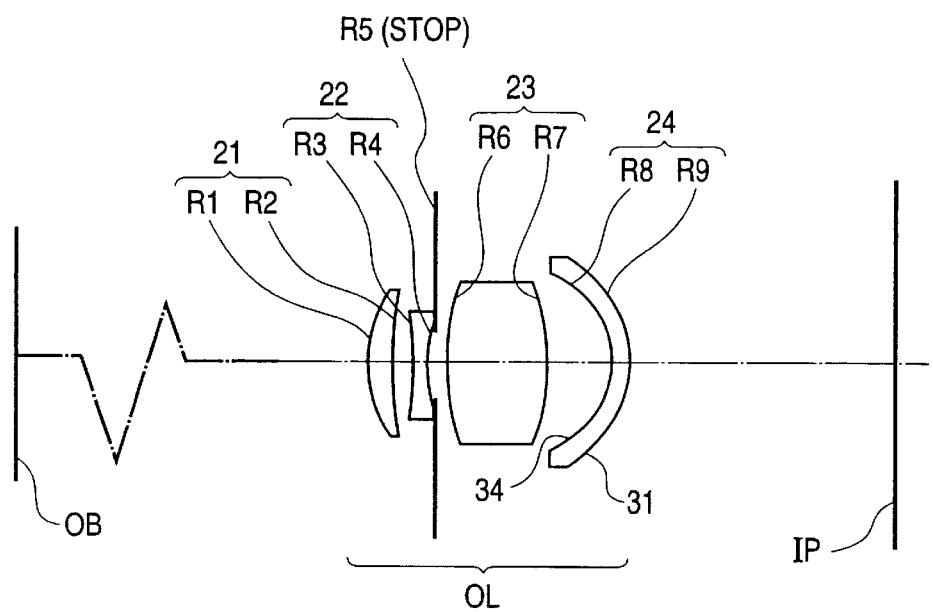
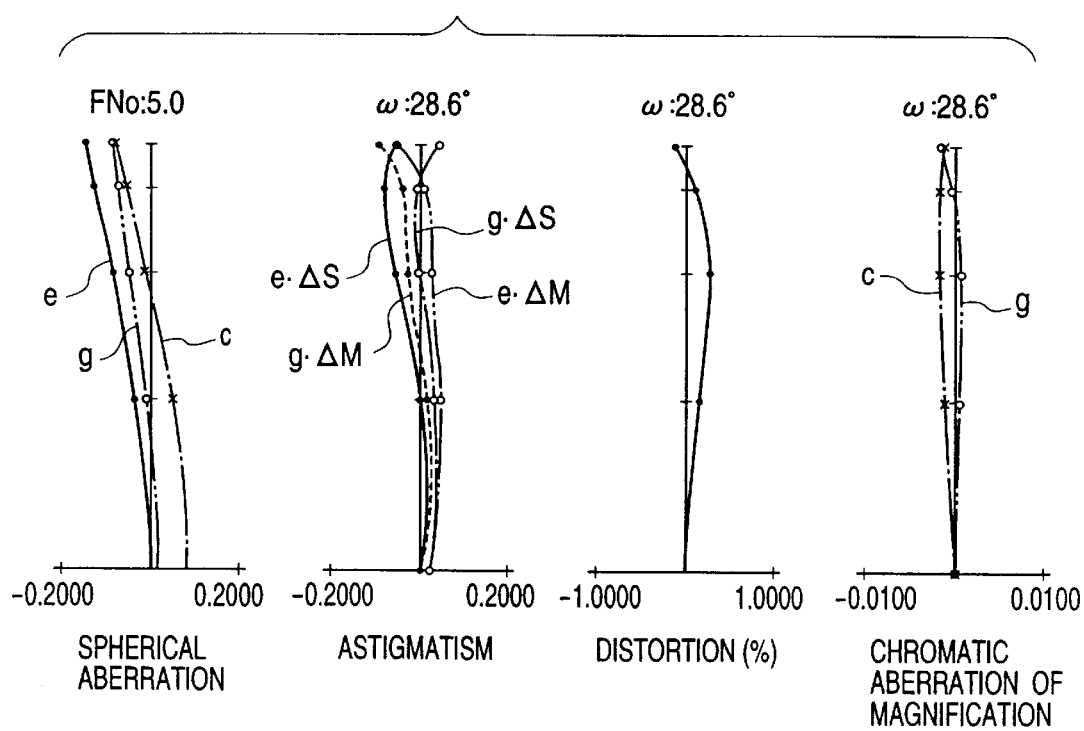

IMAGING LENS AND IMAGE READING APPARATUS USING IT

BACKGROUND OF THE INVENTION

1. Field of the Invention

The present invention relates to an imaging lens and an image reading apparatus using it and, more particularly, to those capable of reading an image at high accuracy by properly correcting curvature of field, astigmatism, etc. of the imaging lens in reading of image information in the line-sequential reading method by use of an image pickup element such as CCD or the like and suitably applicable, for example, to such apparatus as image scanners, copiers, facsimile machines, and so on.

2. Related Background Art

FIG. 1 is a schematic diagram of a major part of an example wherein the conventional imaging lens for reading of an image is used in a flat-bed image scanner.

In the same figure light emitted from an illumination light source 701 illuminates an original 708 directly or via a reflector 709, an optical path of reflected light from the original 708 is bent by first, second, third, and fourth reflecting mirrors 703a, 703b, 703c, 703d inside a carriage 706, and the reflected light is focused on a surface of linear image sensor 705 (hereinafter represented by "CCD") such as the CCD (Charge Coupled Device) or the like by the imaging lens 704. The carriage 706 is moved in a direction of an arrow A (sub scanning direction), illustrated in FIG. 1, by a sub scanning motor 707 to read the image information of the original 708. The CCD 705 in the same figure is composed of a plurality of light receiving elements arrayed in a one-dimensional direction (main scanning direction).

In the above structure it is necessary to reduce the size of the carriage 706 in order to decrease the size of the image scanner. For downsizing of the carriage 706, there are methods of maintaining the optical path length, for example, by increasing the number of reflecting mirrors or by reflecting the light several times by a single reflecting mirror.

These methods, however, greatly increase the cost, because the internal structure of the carriage 706 becomes complicated, so as to require strict assembling accuracy. They also degrade the imaging performance in proportion to the surface precision of the reflecting mirrors and the number of reflections, so as to affect the read image as well.

Another conceivable method is to decrease the object-to-image distance by increasing the angle of view of the imaging lens (imaging system) 704 to a wider angle. Various types of imaging lenses have been suggested with a wide angle of view that could be realized in a practical number of lenses and in a spherical surface shape. However, they have an upper limit of about 25° to a half angle of view and thus setting an angle of view wider than this increases the curvature of field and astigmatism, so as to result in a failure in demonstrating adequate optical performance.

FIG. 2 is a lens sectional view of Numerical Example A, detailed hereinafter, of a conventional imaging lens and FIG. 3 is a diagram to show various aberrations of Numerical Example A, described hereinafter, of the imaging lens illustrated in FIG. 2. The imaging lens in FIG. 2 is constructed in the structure of a telephoto type having five lenses, which are a positive, first lens 91, a negative, second lens 92, a stop, a positive, third lens 93, a negative, fourth lens 94, and a negative, fifth lens 95 arranged in the named order from the object (original) side. The imaging lens in the same figure is set toward a goal of use at the half view angle of 30°, but astigmatism becomes larger at view angles greater than approximately 70% in the object height (near the half view angle of 22°), as shown in the aberration diagram of FIG. 3. It is hard to correct the astigmatism further while suppressing the other aberrations.

There were many suggestions to use imaging lenses having much wider view angles by introducing a general, aspherical surface of a rotationally symmetric shape to the above type or the like to correct wavefront aberration, but it was not easy to realize a sufficiently wide view angle, because no fundamental solution was given to the curvature of field, astigmatism, and so on.

A method for correcting the astigmatism is, for example, the image reading apparatus suggested in Japanese Patent Application Laid-Open No. 5-14602. In the application, astigmatism is corrected well by placing an optical member having refracting power rotationally asymmetric in the normal directions to the optical axis, in an optical path between the imaging system and the image reading means. This method is effective to correct astigmatism, but necessitates a new optical member placed in the optical path, thus posing issues of an increase in the scale of the overall apparatus and an increase in adjustment items in assembly.

The apparatus can have high resolving power at all the view angles by making an eclipse at wide view angles, but the image reading apparatus is required to have an aperture efficiency of 100%. Therefore, this approach also fails to accomplish the above object.

SUMMARY OF THE INVENTION

An object of the present invention is to provide an imaging lens capable of achieving sufficient imaging performance with a small number of lenses even at ultra-wide angles while correcting for curvature of field, astigmatism, etc. well, by providing at least one surface out of a plurality of surfaces forming the imaging lens with a refracting power rotationally asymmetric with respect to the optical axis, and also providing an image reading apparatus using it.

An imaging lens of the present invention is an imaging lens for use in image reading, for imaging image information of an original on reading means, wherein at least one surface out of a plurality of surfaces forming the imaging lens has a refracting power rotationally asymmetric with respect to the optical axis.

The present invention is also characterized in that the surface having the rotationally asymmetric refracting power is a surface of a rotationally asymmetric shape and is integral with a surface of a single lens forming the imaging lens.

The present invention is also characterized in that the surface having the rotationally asymmetric refracting power is a diffracting optical element having a rotationally asymmetric refracting power and is integral with a surface of a single lens forming the imaging lens.

The present invention is also characterized in that the surface having the rotationally asymmetric refracting power is formed by adding a member of a rotationally asymmetric shape with respect to the optical axis to a rotationally symmetric surface.

The present invention is also characterized in that the surface having the rotationally asymmetric refracting power is formed by adding a diffracting optical element having a refracting power rotationally asymmetric with respect to the optical axis, to a rotationally symmetric surface.

An image reading apparatus of the present invention is arranged to image the image information of the original illuminated by light from an illumination light source on a surface of the reading means and read the image information, using the imaging lens described above.

Another imaging lens of the present invention is an imaging lens for use in image reading, for imaging image information of an original on reading means, the imaging lens having a stop in the imaging lens, wherein at least one surface not facing the stop, out of a plurality of surfaces forming the imaging lens, has a refracting power rotationally asymmetric with respect to the optical axis.

The present invention is also characterized in that the surface having the rotationally asymmetric refracting power is a surface of a rotationally asymmetric shape having a rotationally symmetric refracting power on the optical axis and is integral with a surface of a single lens forming the imaging lens.

The present invention is also characterized in that the surface having the rotationally asymmetric refracting power is a surface the radius of curvature of a generating line of which is equal to the radius of curvature of a meridian line thereof on the optical axis.

The present invention is also characterized in that the surface having the rotationally asymmetric refracting power is formed by adding a member of a rotationally asymmetric shape with respect to the optical axis to a rotationally symmetric surface.

Another image reading apparatus of the present invention is arranged to image the image information of the original illuminated by light from an illumination light source on a surface of the reading means and read the image information, using the imaging lens described above.

Another imaging lens of the present invention is an imaging lens for use in image reading, for imaging image information of an original on reading means, wherein at least one surface at which an overlapping area of a range of up to 70% of a distance from a center to the outermost periphery of each of on-axis rays and outermost off-axis rays is not more than 50% of an area of a range of up to 70% of the distance from the center to the outermost periphery of the on-axis rays, out of a plurality of surfaces forming the imaging lens, has refracting power rotationally asymmetric with respect to the optical axis.

The present invention is also characterized in that the surface having the rotationally asymmetric refracting power is a surface of a rotationally asymmetric shape having a rotationally symmetric refracting power on the optical axis and is integral with a surface of a single lens forming the imaging lens.

The present invention is also characterized in that the surface having the rotationally asymmetric refracting power is a surface the radius of curvature of a generating line of which is equal to the radius of curvature of a meridian line thereof on the optical axis.

The present invention is also characterized in that the surface having the rotationally asymmetric refracting power is formed by adding a member of a rotationally asymmetric shape with respect to the optical axis to a rotationally symmetric surface.

Another image reading apparatus of the present invention is arranged to image the image information of the original illuminated by light from an illumination light source on a surface of the reading means and read the image information, using the imaging lens described above.

Another imaging lens of the present invention is an imaging lens for use in image reading, for imaging image information of an original on reading means, the imaging lens comprising five lenses, which are a positive, first lens of the meniscus shape with a convex surface thereof facing the side of the original, a second lens whose lens surfaces both are concave surfaces, a third lens whose lens surfaces both are convex surfaces, a positive or negative, fourth lens of a meniscus shape with a convex surface thereof facing the side of the reading means, and a negative, fifth lens of the meniscus shape with a convex surface thereof facing the side of the reading means, arranged in the named order from the original side, wherein at least one surface out of a plurality of surfaces forming the imaging lens has a refracting power rotationally asymmetric with respect to the optical axis.

The present invention is also characterized in that the surface having the rotationally asymmetric refracting power is a surface of a rotationally asymmetric shape having a rotationally symmetric refracting power on the optical axis and is integral with a surface of a single lens forming the imaging lens.

The present invention is also characterized in that the surface having the rotationally asymmetric refracting power is the surface a radius of curvature of a generating line of which is equal to the radius of curvature of a meridian line thereof on the optical axis.

The present invention is also characterized in that the surface having the rotationally asymmetric refracting power is formed by adding a member of a rotationally asymmetric shape with respect to the optical axis to a rotationally symmetric surface.

The present invention is also characterized by further comprising a stop between the second lens and the third lens.

Another image reading apparatus of the present invention is arranged to image the image information of the original illuminated by light from an illumination light source on a surface of the reading means and read the image information, using the imaging lens described above.

Another imaging lens of the present invention is an imaging lens for use in image reading, for imaging image information of an original on reading means, the imaging lens comprising four lenses, which are a positive, first lens of the meniscus shape with a convex surface thereof facing the side of the original, a second lens whose lens surfaces both are concave surfaces, a third lens whose lens surfaces both are convex surfaces, and a negative, fourth lens of the meniscus shape with a convex surface thereof facing the side of the reading means, arranged in the named order from the original side, wherein at least one surface out of a plurality of surfaces forming the imaging lens has a refracting power rotationally asymmetric with respect to the optical axis.

The present invention is also characterized in that the surface having the rotationally asymmetric refracting power is a surface of a rotationally asymmetric shape having a rotationally symmetric refracting power on the optical axis and is integral with a surface of a single lens forming the imaging lens.

The present invention is also characterized in that the surface having the rotationally asymmetric refracting power is a surface the radius of curvature of a generating line of which is equal to the radius of curvature of a meridian line thereof on the optical axis.

The present invention is also characterized in that the surface having the rotationally asymmetric refracting power is formed by adding a member of a rotationally asymmetric shape with respect to the optical axis to a rotationally symmetric surface.

The present invention is also characterized by further comprising a stop between the second lens and the third lens.

Another image reading apparatus of the present invention is arranged to image the image information of the original illuminated by light from an illumination light source on a surface of the reading means and read the image information, using the imaging lens described above.

Another imaging lens of the present invention is an imaging lens for use in image reading, for imaging image information of an original on reading means, wherein at least one surface out of a plurality of surfaces forming the imaging lens has a refracting power rotationally asymmetric with respect to the optical axis, wherein in such a coordinate system that an origin lies at an intersecting point of the one surface with the optical axis, x along a direction of the optical axis, y along a reading direction of the reading means, and z along a direction perpendicular to the optical-axis direction x and to the reading direction y, letting R(y) be the radius of local curvature at a certain point in the reading direction y on an xy section of the surface, and r(y) be the radius of local curvature in a direction perpendicular to the xy plane and normal to the shape of the xy section in the reading direction y, the following condition is satisfied in a range of the reading direction y from 0 to a passing position y' of an outermost off-axis principal ray;

$$0 \leq |[R(y)-r(y)]/[f_d(N_d-1)]| \leq 0.15$$

where $f_d$: focal length of the overall system of the imaging lens at the d-line; and $N_d$: index of refraction of a lens with said one surface formed therein, at the d-line.

The present invention is also characterized in that the R(y) satisfies the following condition in the range of the reading direction y from 0 to the passing position y' of the outermost off-axis principal ray:

$$0 \neq |dR(y)/dy|.$$

The present invention is also characterized in that the R(y) and the r(y) are equal to each other on the optical axis.

The present invention is also characterized in that the surface having the rotationally asymmetric refracting power is a surface of a rotationally asymmetric shape and is integral with a surface of a single lens forming the imaging lens.

The present invention is also characterized in that the surface having the rotationally asymmetric refracting power is formed by adding a member of a rotationally asymmetric shape with respect to the optical axis to a rotationally symmetric surface.

The present invention is also characterized in that the reading means is a linear image sensor.

Another image reading apparatus of the present invention is arranged to image the image information of the original illuminated by light from an illumination light source on a surface of the reading means and read the image information, using the imaging lens described above.

BRIEF DESCRIPTION OF THE DRAWINGS

FIG. 18 is a lens sectional view of Numerical Example 8 of the present invention;

FIG. 19 is a diagram to show various aberrations of Numerical Example 8 of the present invention;

DETAILED DESCRIPTION OF THE PREFERRED EMBODIMENTS

Figure 1:
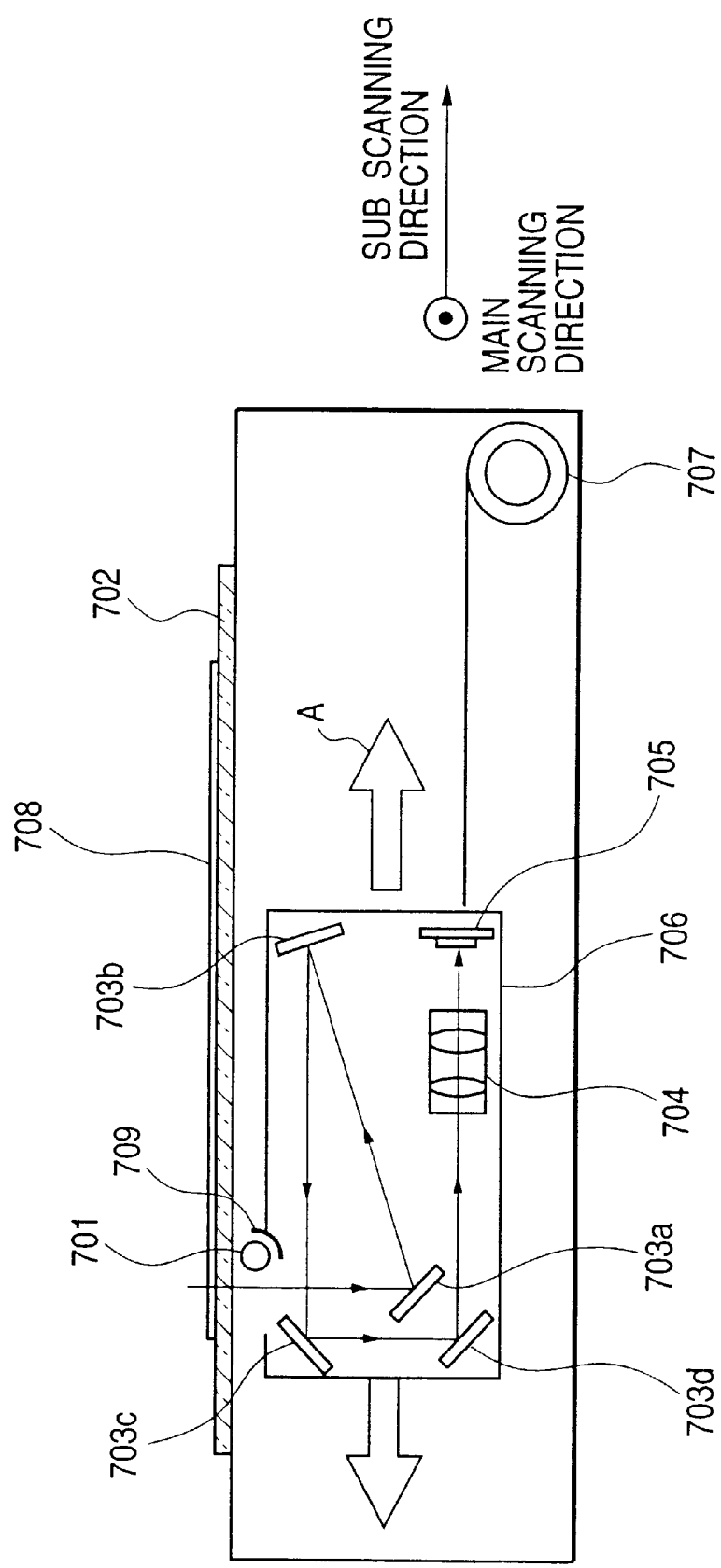
FIG. 1 is a schematic diagram of major part of the conventional image reading apparatus.
Figure 2:
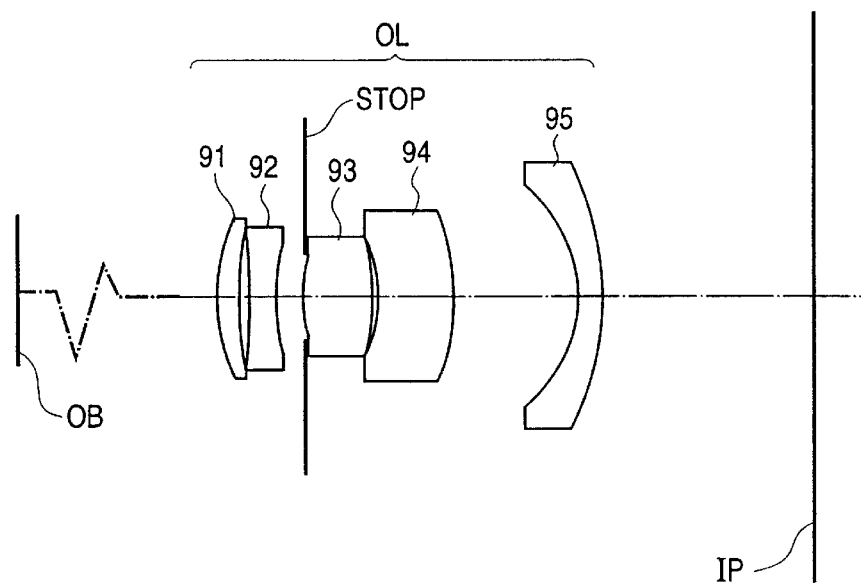
FIG. 2 is a lens sectional view of conventional Numerical Example A.

FIG. 4, FIG. 6, FIG. 8, FIG. 10, FIG. 12, FIG. 14, FIG. 16, FIG. 18, FIG. 20, FIG. 22, FIG. 24, and FIG. 26 are the lens sectional views of Numerical Examples 1 to 12, respectively, of the present invention, which will be described hereinafter, and FIG. 5, FIG. 7, FIG. 9, FIG. 11, FIG. 13, FIG. 15, FIG. 17, FIG. 19, FIG. 21, FIG. 23, FIG. 25, and FIG. 27 are the aberration diagrams of Numerical Examples 1 to 12, respectively, of the present invention described hereinafter.

In the lens sectional views OL represents the imaging lens for image reading, OB represents the original (hereinafter referred to as "object"), and IP represents the reading means (hereinafter referred to as "image plane") such as the line sensor (CCD) or the like.

Each of the imaging lenses in FIG. 4, FIG. 6, FIG. 8, FIG. 10, FIG. 12, FIG. 14, and FIG. 16 is constructed in the structure of the telephoto type having five lenses, which are a positive, first lens 11 of the meniscus shape with a convex surface thereof facing the object side, a second lens 12 whose lens surfaces both are concave surfaces, a third lens 13 whose lens surfaces both are convex surfaces, a positive or negative, fourth lens 14 of the meniscus shape with a convex surface thereof facing the image plane side, and a negative, fifth lens 15 of the meniscus shape with a convex surface thereof facing the image plane side, arranged in the named order from the object side.

Each of the imaging lenses in FIG. 18, FIG. 20, FIG. 22, FIG. 24, and FIG. 26 is constructed in the structure of the telephoto type having four lenses, which are a positive, first lens 21 of the meniscus shape with a convex surface thereof facing the object side, a second lens 22 whose lens surfaces both are concave surfaces, a third lens 23 whose lens surfaces both are convex surfaces, and a negative, fourth lens 24 of the meniscus shape with a convex surface thereof facing the image plane side, arranged in the named order from the object side.

In each of Numerical Examples 1 to 12 a stop is provided between the second lens and the third lens. In each of Numerical Examples 1 to 12 the aperture efficiency is 100%.

In the present invention at least one surface not facing the stop, out of the plural surfaces forming the imaging lens, is a surface having a refracting power rotationally asymmetric with respect to the optical axis.

The surface having the rotationally asymmetric refracting power is a surface of a rotationally asymmetric shape and is formed so as to be integral with a surface of a single lens forming the imaging lens.

The phrase "being formed so as to be integral with a surface of a single lens" means, mainly, "being made of a lens material by grinding, injection, molding, and so on".

The surface having the rotationally asymmetric refracting power is also formed by adding a member of the rotationally asymmetric shape with respect to the optical axis to a rotationally symmetric surface.

The phrase "being formed by adding the member to the rotationally symmetric surface" means, mainly, "being formed by the replica method or the like".

In Numerical Example 1 a member 31 of the rotationally asymmetric shape with respect to the optical axis is formed in the object-side lens surface (rotationally symmetric surface) R10 of the fifth lens 15.

In Numerical Example 2 a member 32 of the rotationally asymmetric shape with respect to the optical axis is formed in the object-side lens surface (rotationally symmetric surface) R10 of the fifth lens 15.

In Numerical Example 3 a diffracting optical element 33 having the refracting power rotationally asymmetric with respect to the optical axis is added to the object-side lens surface (rotationally symmetric surface) R10 of the fifth lens 15.

In Numerical Example 4 the member 31 of the rotationally asymmetric shape with respect to the optical axis is formed in each of the both lens surfaces (rotationally symmetric surfaces) R10, R11 of the fifth lens 15.

In Numerical Example 5 the member 31 of the rotationally asymmetric shape with respect to the optical axis is formed in the image-side lens surface (rotationally symmetric surface) R11 of the fifth lens 15.

In Numerical Example 6 the member 31 of the rotationally asymmetric shape with respect to the optical axis is formed in the image-side lens surface (rotationally symmetric surface) R9 of the fourth lens 14.

In Numerical Example 7 the member 31 of the rotationally asymmetric shape with respect to the optical axis is formed in the object-side lens surface (rotationally symmetric surface) R3 of the second lens 12.

In Numerical Example 8 the member 31 of the rotationally asymmetric shape with respect to the optical axis is formed in the image-side lens surface (rotationally symmetric surface) R9 of the fourth lens 24 and a member 34 of the rotationally symmetric shape is formed in the object-side lens surface (rotationally symmetric surface) R8.

In Numerical Example 9 the member 31 of the rotationally asymmetric shape with respect to the optical axis is formed in each of the image-side lens surface (rotationally symmetric surface) R7 of the third lens 23 and the image-side lens surface (rotationally symmetric surface) R9 of the fourth lens 24.

In Numerical Example 10 the member 31 of the rotationally asymmetric shape with respect to the optical axis is formed in the object-side lens surface (rotationally symmetric surface) R8 of the fourth lens 24.

In Numerical Example 11 the member 31 of the rotationally asymmetric shape with respect to the optical axis is formed in the image-side lens surface (rotationally symmetric surface) R7 of the third lens 23.

In Numerical Example 12 the member 31 of the rotationally asymmetric shape with respect to the optical axis is formed in the object-side lens surface (rotationally symmetric surface) R3 of the second lens 22.

The "rotationally asymmetric" surface will be referred hereinafter to a "free curved surface."

In Numerical Examples 1, and 4 to 12 the shape of the free curved surface 31 (generating line shape X and meridian line shape S) is expressed by Eqs. (1), (2) described hereinafter. In Numerical Example 2 the shape (generating line shape X and meridian line shape S) of the object-side free curved surface 32 of the fifth lens 15 is expressed by Eqs. (1), (3) described hereinafter. In Numerical Example 3 a phase polynomial for the diffracting optical element 33 added to the object-side lens surface R10 of the fifth lens 15 is expressed by Eq. (4) described hereinafter. In Numerical Example 8 the shape of the rotationally symmetric, aspherical surface 34 formed in the object-side lens surface R8 of the fourth lens 24 is expressed by Eq. (5) described hereinafter.

In each of Numerical Examples 1, and 4 to 12 the radius R of curvature of the generating line of the free curved surface 31 is equalized to the radius r of curvature of the meridian line thereof on the optical axis and the radius r of curvature in the direction of the meridian line is made to vary and differ from the radius R of curvature in the direction of the generating line with distance from the optical axis. This lens surface configuration permits the sagittal image surface and the meridional image surface to be set independently of each other, whereby the astigmatism can be corrected for all the view angles.

In Numerical Example 8 the various aberrations including coma can be corrected well by introducing the rotationally symmetric, aspherical surface to the lens surface R8.

Figure 28:
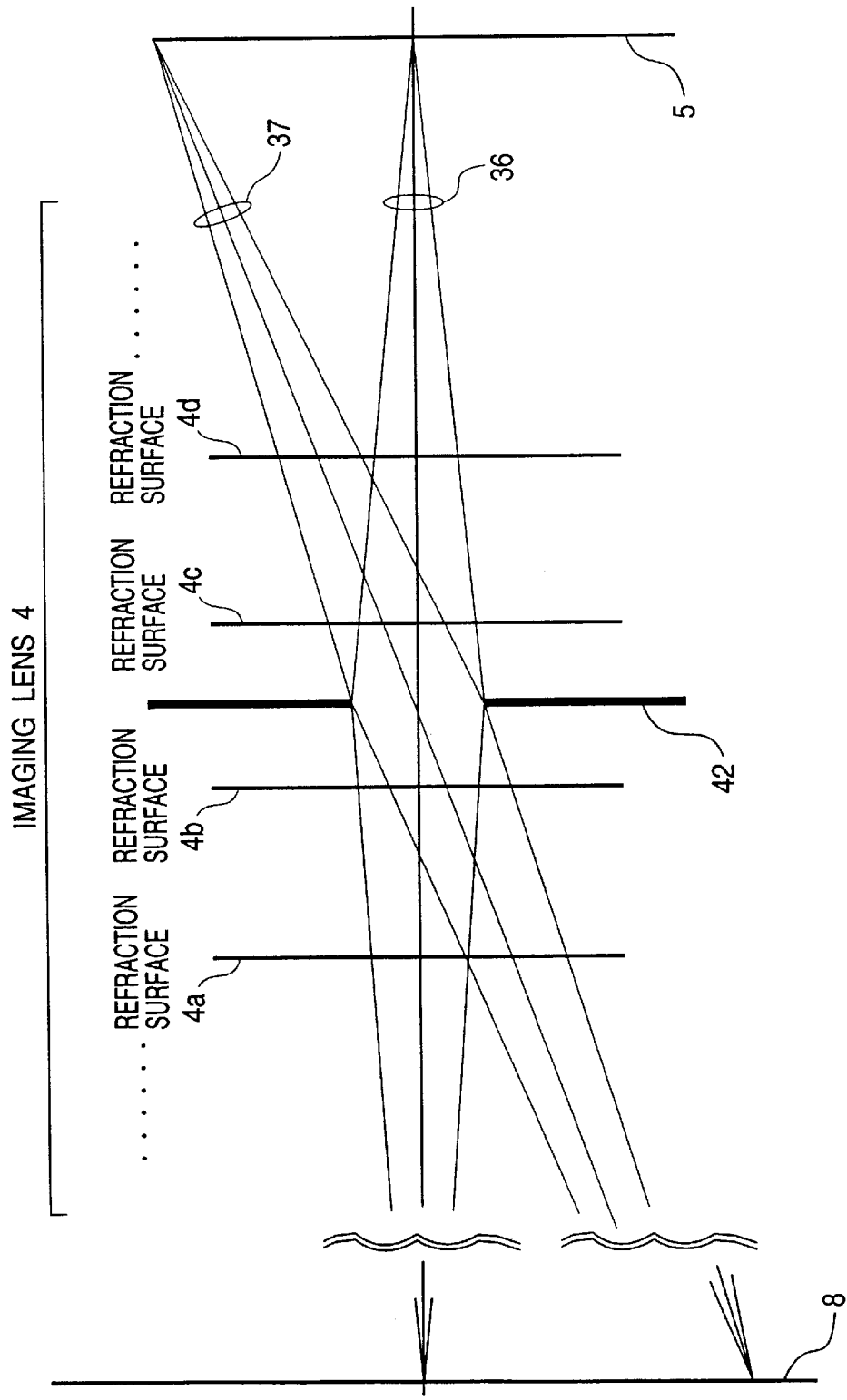
FIG. 28 is a schematic diagram of a major part to show the lens configuration of the present invention.

The optic reason why the free curved surface (or the diffracting optical element) is formed in the surface not facing the stop in the present invention will be described referring to FIG. 28.

In the same figure beams are thick at both surfaces 4b, 4c facing the stop 42 out of the refracting surfaces forming the imaging lens 4 and a percentage of an overlapping area between on-axis rays 36 and outermost off-axis rays 37 is large there; it thus becomes hard to correct for the aberrations such as spherical aberration and coma. Particularly, rays in the range of up to 70% of the distance from the center to the outermost periphery of rays (which will be called 70%-rays) are dominant as to the imaging performance and the above correction will become particularly difficult if the overlapping area of the 70%-rays of the on-axis rays 36 and the outermost off-axis rays 37 is over 50% of the 70%-rays of the on-axis rays 36; in that case it is not possible to design a lens having sufficient optical performance.

The imaging lenses of the present invention are thus designed to correct for curvature of field and astigmatism well by applying the free curved surface to at least one surface not facing the stop, out of the plural surfaces forming the imaging lens as described above.

Particularly, in the present invention it is more preferable to provide at least one surface at which the overlapping area of the range of up to 70% of the distance from each center of the on-axis rays and the outermost off-axis rays to the outermost periphery is not more than 50% of the area of the range of up to 70% of the distance from the center to the outermost periphery of the on-axis rays, out of the plural surfaces forming the imaging lens, with the refracting power rotationally asymmetric with respect to the optical axis.

In Numerical Examples 1, and 4 to 12 the free curved surface is a surface of the rotationally asymmetric shape having the rotationally symmetric refracting power on the optical axis and, therefore, has high resolving power even at low angles of view.

Figure 29:
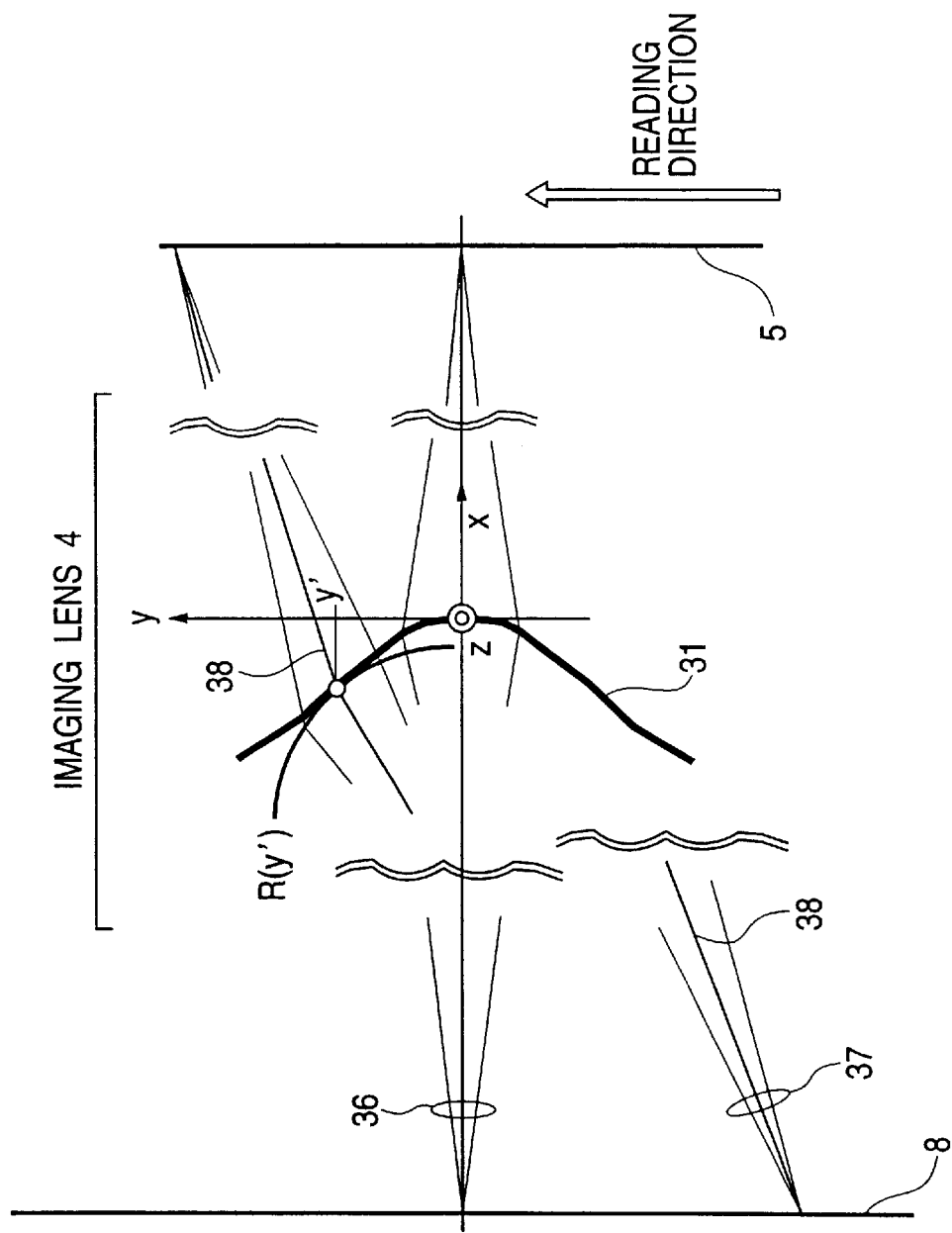
FIG. 29 is a schematic diagram of a major part to show the shape of a free curved surface of the present invention.

The shape of the above free curved surface will be described referring to FIG. 29.

In the same figure let us assume that a surface of part of plural surfaces forming the imaging lens 4 is a curved free surface 31, the origin is defined at an intersecting point of the free curved surface 31 with the optical axis, the axis x is taken along the optical-axis direction, the axis y is taken along the reading direction of the reading means (CCD) 5, and the axis z is taken along a direction perpendicular to the optical-axis direction x and to the reading direction y. Then let R(y) stand for the radius of local curvature of the free curved surface 31 at a certain point in the reading direction y on the xy cross section (plane), and let r(y) stand for the radius of local curvature thereat in a direction perpendicular to the xy plane and normal to the xy sectional shape in the reading direction y.

When the reading direction y lies in the range of 0 (on axis) to a passing position y' of the outermost off-axis principal ray 38, the imaging lens satisfies the following condition:

$$0 \leq |[R(y)-r(y)]/[f_d(N_d-1)]| \leq 0.15 \qquad (a)$$

where $f_d$: focal length of the overall system of the imaging lens at the d-line, and $N_d$: index of refraction of the lens with the free curved surface formed therein, at the d-line.

Eq. (a) of the above condition is for well correcting the curvature of field, astigmatism, etc., so as to achieve sufficient imaging performance even at ultra-wide angles by a configuration including the small number of lenses. If equation (a) is not satisfied, astigmatism will not be able to be corrected and it will become difficult to correct for the curvature of field and the other aberrations, which is not preferable.

In the range of the reading direction y from 0 to the passing position y' of the outermost off-axis principal ray 38, aforementioned R(y) satisfies the following condition:

$$0 \neq |dR(y)/dy| \qquad (b)$$

The above inequality (b) is for better correction of the curvature of field. If the inequality (b) is not satisfied, i.e., if $0=|dR(y)/dy|$ in the range of the reading direction y from 0 to the passing position y' of the outermost off-axis principal ray 38, higher-order aberration will appear in the curvature of meridional image surface and it will become difficult to correct for the aberration. This inequality (b) means that there is no inflection point.

By equalizing above R(y) and r(y) on the optical axis to each other, i.e., by making R(0)=r(0), the imaging performance is maintained high on the optical axis.

In Numerical Example 1 the free curved surface is introduced into the object-side surface R10 of the fifth lens 15, but the other surface R11 thereof is a spherical surface. This fifth lens 15 may be formed by press molding, injection molding, or the like, but it is relatively easier to form the fifth lens 15 by polishing and grinding, because the other surface is the spherical surface. It can thus be produced at low cost (readily) without a mold, even in the case of small-batch production.

Figure 3:
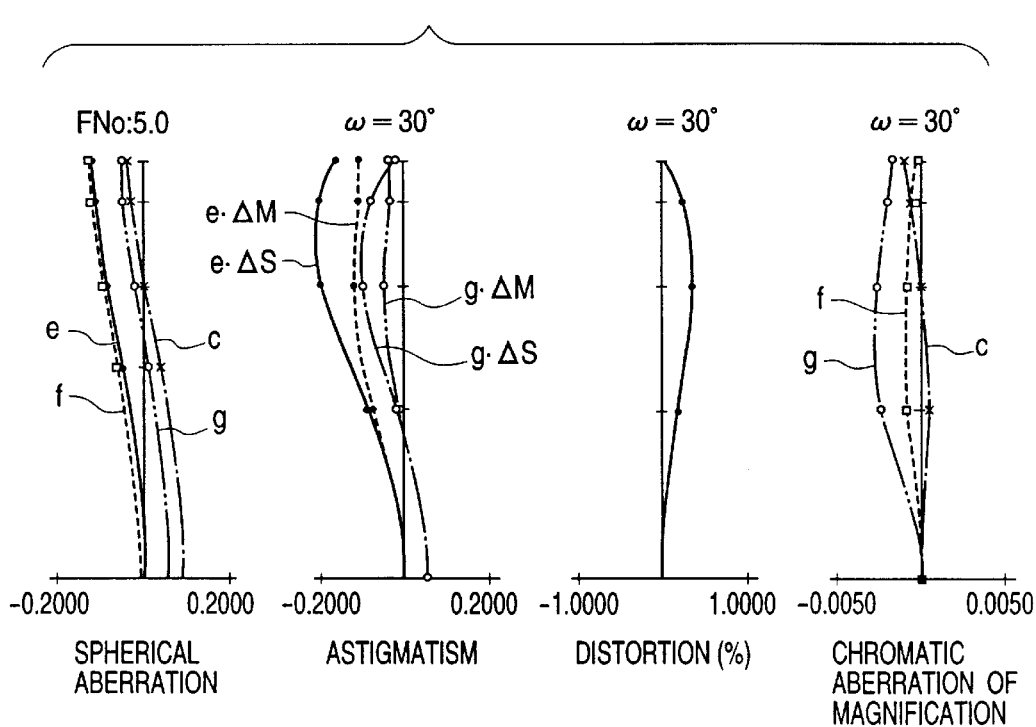
FIG. 3 is a diagram to show various aberrations of conventional Numerical Example A.
Figure 4:
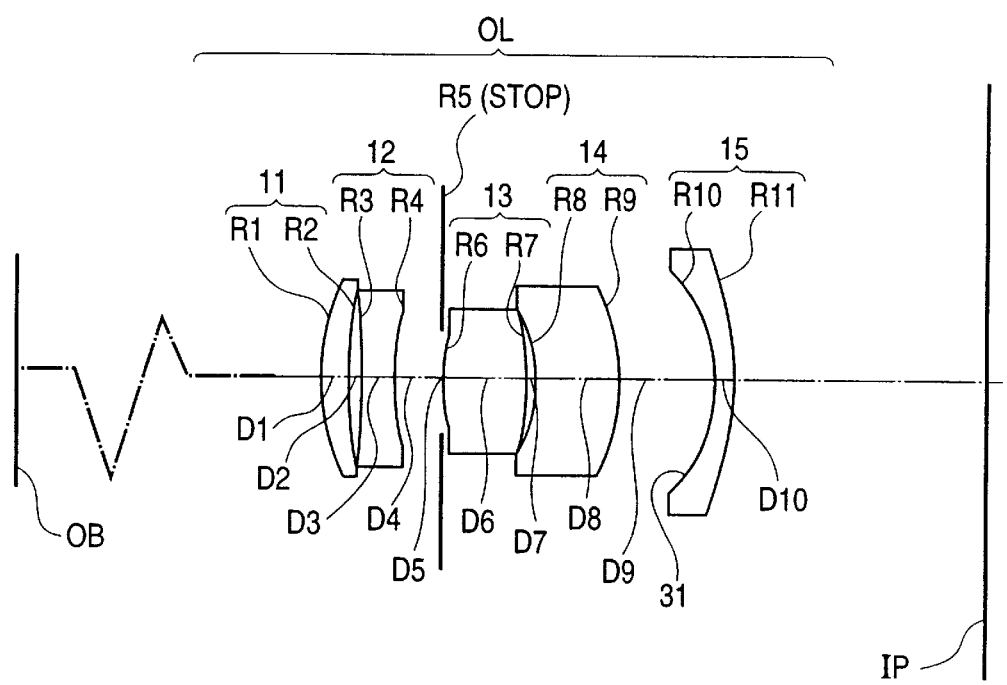
FIG. 4 is a lens sectional view of Numerical Example 1 of the present invention.
Figure 5:
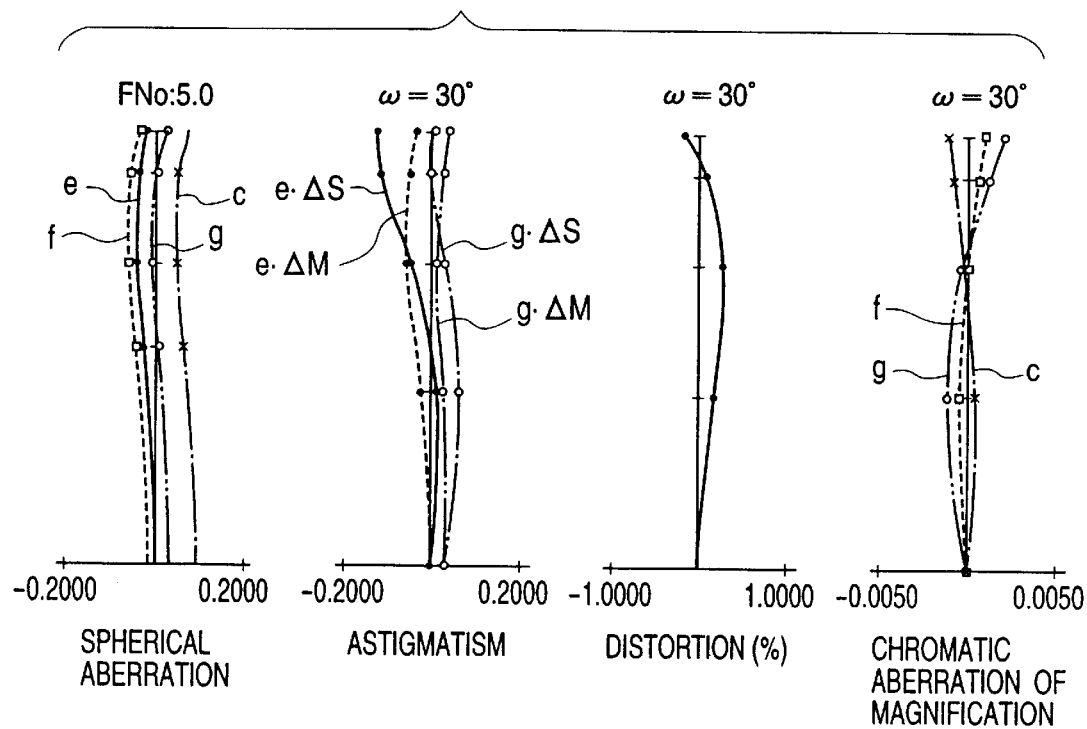
FIG. 5 is a diagram to show various aberrations of Numerical Example 1 of the present invention.
Figure 6:
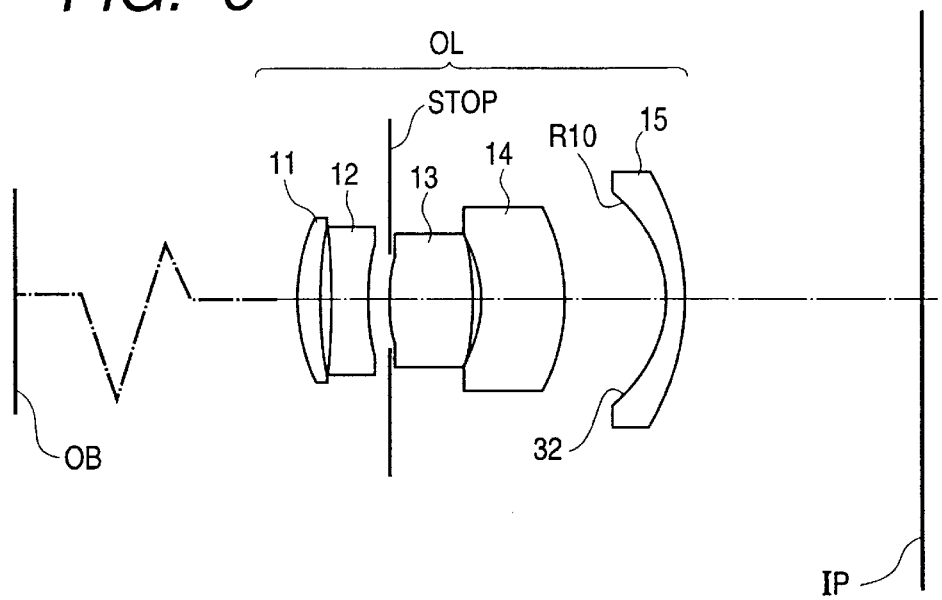
FIG. 6 is a lens sectional view of Numerical Example 2 of the present invention.

In Numerical Example 1 the various aberrations, as illustrated in FIG. 5, appear so that the sagittal image surface clings to the meridional image surface, whereby astigmatism is canceled out. Further, amounts of the various aberrations other than the curvature of field and the astigmatism can be controlled at the same level as in the case of the spherical surface system illustrated in FIG. 3 described above.

In Numerical Example 2 the free curved surface 32 is formed so that the radius R of curvature of the generating line and the radius r of curvature of the meridian line are independent of the distance from the optical axis, different from the free curved surface 31 in Numerical Example 1.

In Numerical Example 2, because the radius R of curvature of the generating line and the radius r of curvature of the meridian line of the free curved surface 32 are set different from each other on the optical axis, astigmatism appears on the axis, but astigmatism can be corrected at large angles of view.

Figure 7:
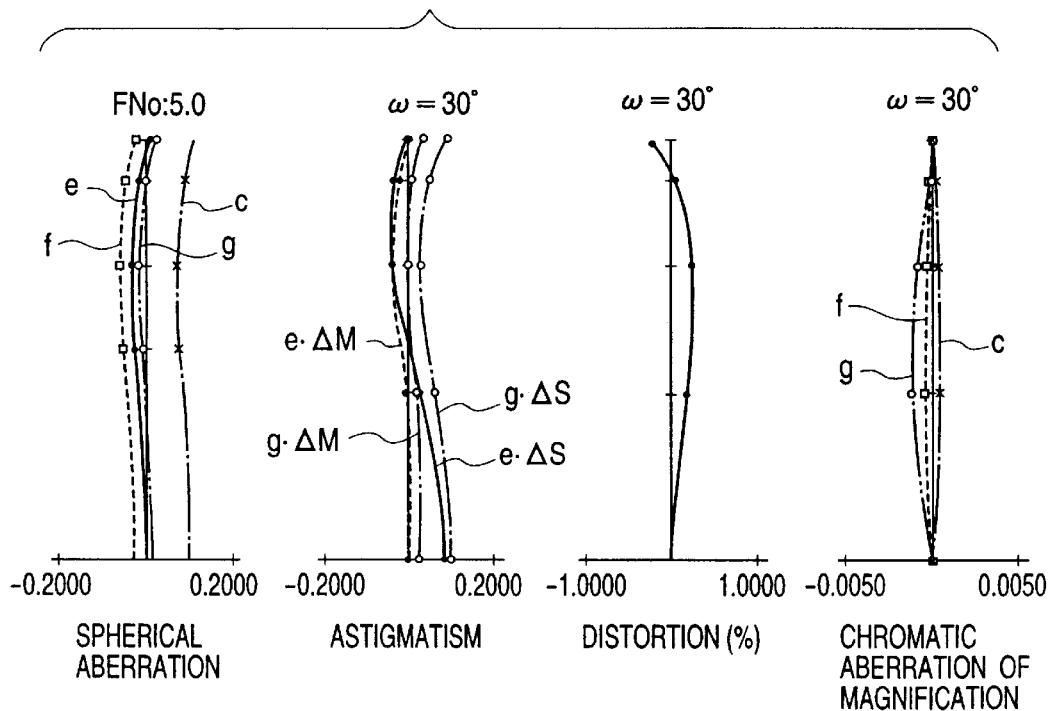
FIG. 7 is a diagram to show various aberrations of Numerical Example 2 of the present invention.
Figure 8:
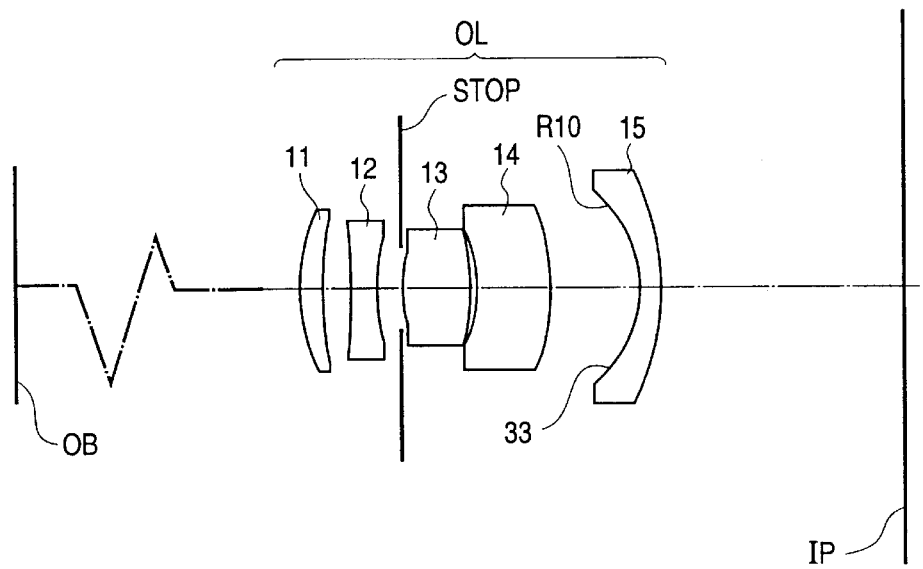
FIG. 8 is a lens sectional view of Numerical Example 3 of the present invention.
Figure 9:
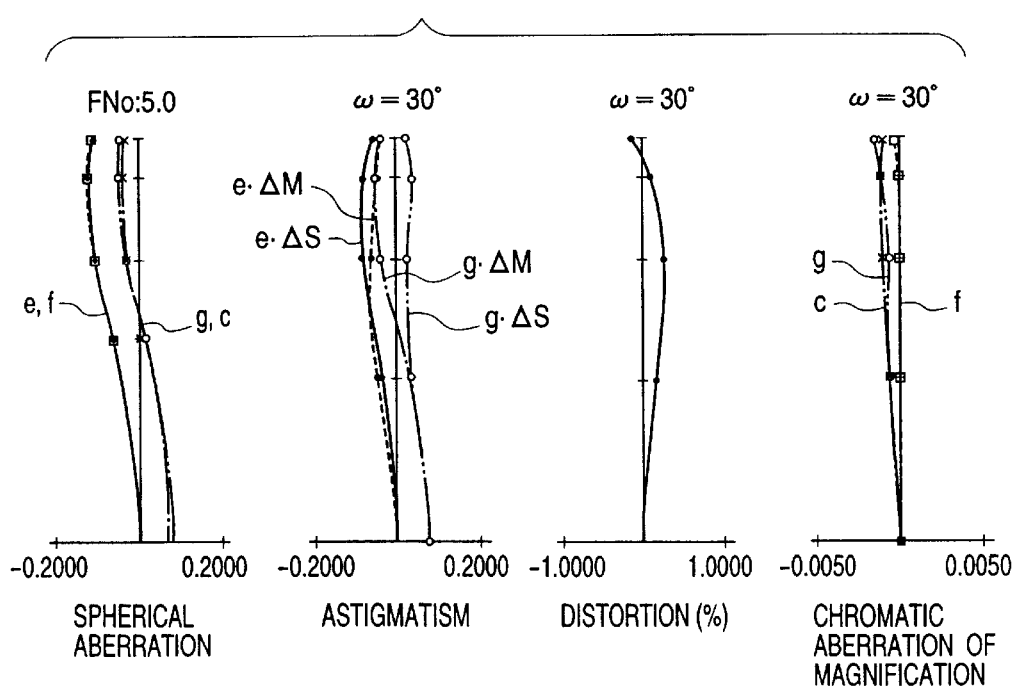
FIG. 9 is a diagram to show various aberrations of Numerical Example 3 of the present invention.
Figure 10:
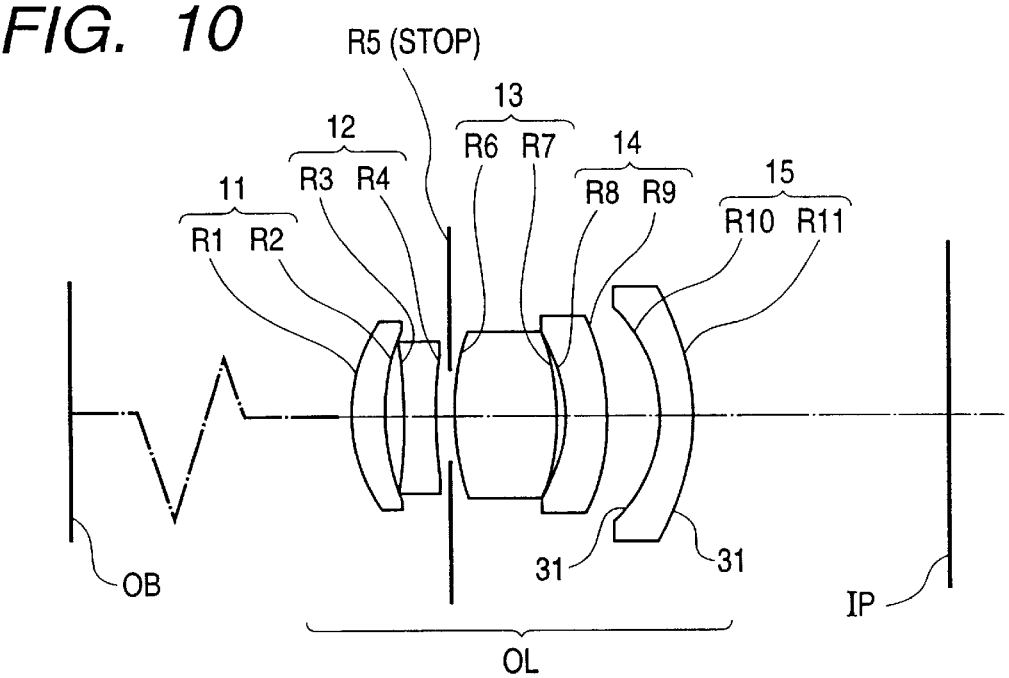
FIG. 10 is a lens sectional view of Numerical Example 4 of the present invention.

In Numerical Example 2, because there appears little spherical aberration as illustrated in FIG. 7, sufficient imaging performance can be achieved even with some astigmatism near the axis. Therefore, the imaging lens can be obtained with the well-balanced imaging performance, including astigmatism, at all the angles of view.

In Numerical Example 3 the diffracting optical element 33 added to the lens surface R10 of the imaging lens has equal refracting power on and near the axis in the directions of the primary and meridian lines, but the refracting power in the direction of the meridian line is different from that in the direction of the generating line in the region apart from the optical axis. Just as in the case of Numerical Example 1, this configuration can greatly improve astigmatism, as compared with the imaging lens composed of only the ordinary spherical surface system. Chromatic aberration is also corrected for well by the color correction effect of the diffracting optical element.

In Numerical Example 4 the free curved surface is introduced into each of both surfaces R10, R11 of the fifth lens 15. This fifth lens 15 may be formed by polishing and grinding, but it may also be formed by a method suitable for mass production, such as press molding, injection molding, or the like, so as to permit volume production at low cost.

Figure 11:
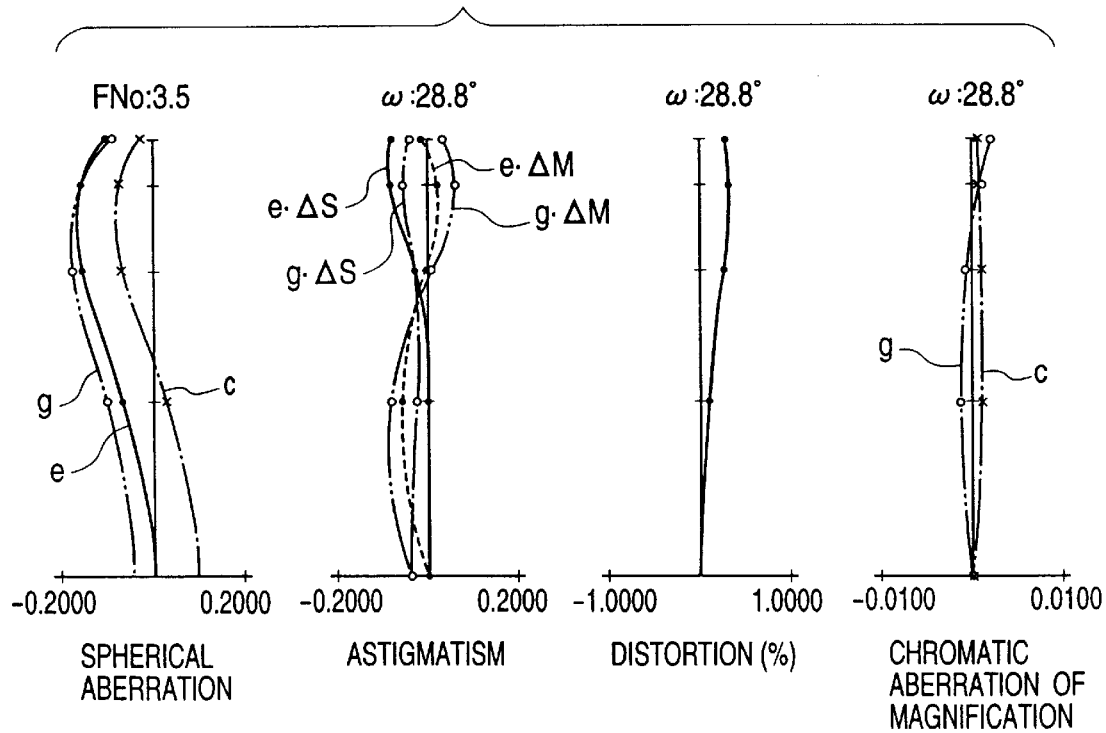
FIG. 11 is a diagram to show various aberrations of Numerical Example 4 of the present invention.
Figure 12:
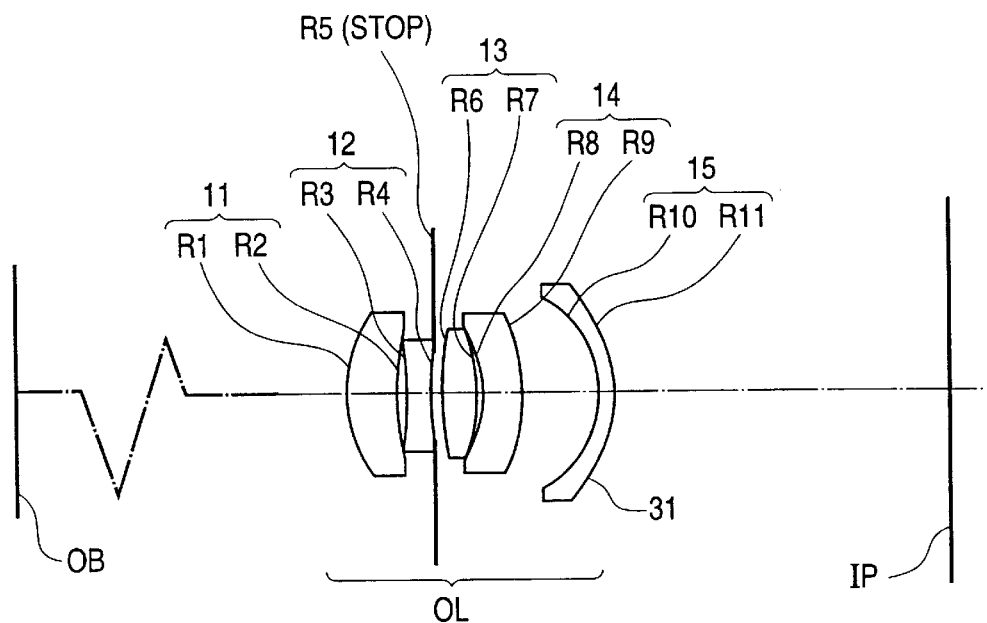
FIG. 12 is a lens sectional view of Numerical Example 5 of the present invention.

In Numerical Example 4 the various aberrations are corrected for well both in the meridional image surface and in the sagittal image surface, as illustrated in FIG. 11, and astigmatism is also suppressed well. Further, the aberrations other than the curvature of field and astigmatism are also corrected for very well.

In Numerical Example 5 the free curved surface is introduced into the surface R11 on the image (CCD) side of the fifth lens 15, but the other surface R10 is a spherical surface. This fifth lens 15 may be formed by press molding, injection molding, or the like, but it is relatively easier to form the fifth lens 15 by polishing and grinding, because the other surface thereof is the spherical surface. It is thus possible to produce the fifth lens at low cost without a mold, even in the case of small-batch production.

Figure 13:
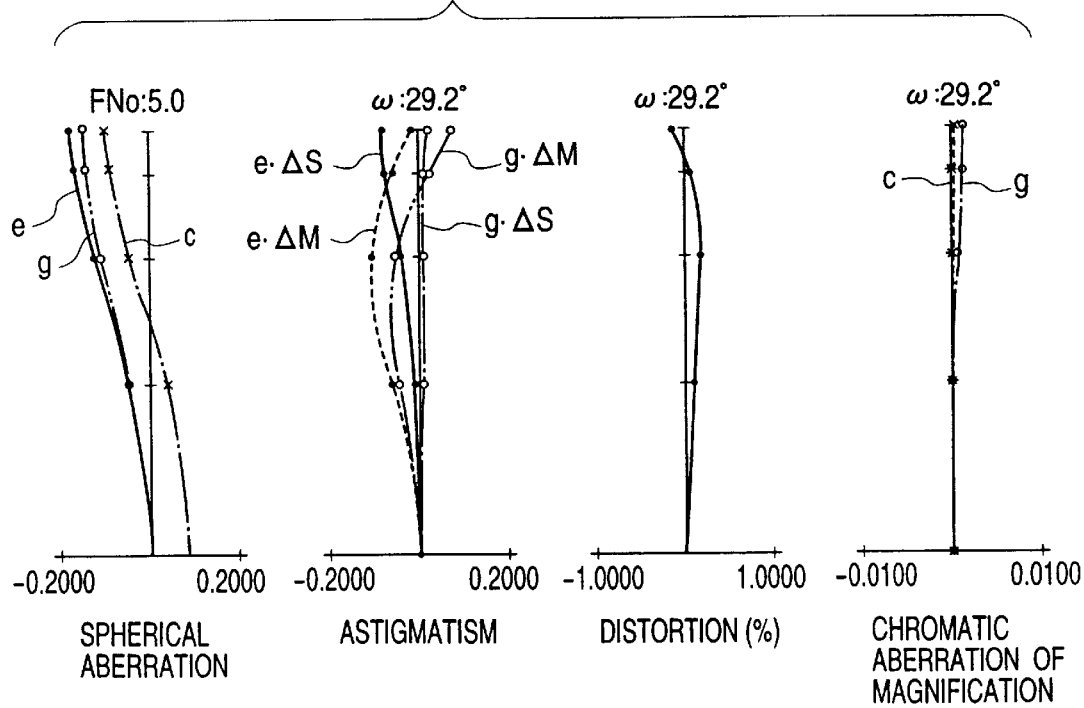
FIG. 13 is a diagram to show various aberrations of Numerical Example 5 of the present invention.
Figure 14:
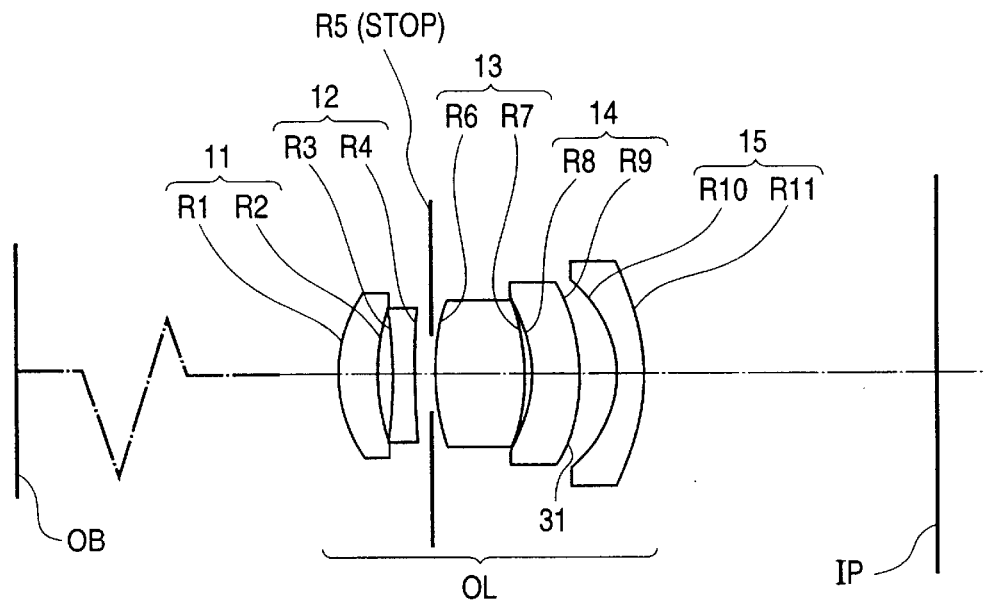
FIG. 14 is a lens sectional view of Numerical Example 6 of the present invention.

In Numerical Example 5 the various aberrations are corrected for well both in the meridional image surface and in the sagittal image surface, as illustrated in FIG. 13, and astigmatism is also suppressed well. Further, the aberrations other than the curvature of field and astigmatism are also corrected for very well.

In Numerical Example 6 the free curved surface is introduced into the surface R9 on the image (CCD) side of the fourth lens 4. The fourth lens 14 may be formed by polishing and grinding, but it is particularly preferable to form the fourth lens 14 by press molding or injection molding, because the thickness of the lens is almost constant in particular as compared with the other lenses. The shape of the free curved surface can be formed with high accuracy by press molding or injection molding.

Figure 15:
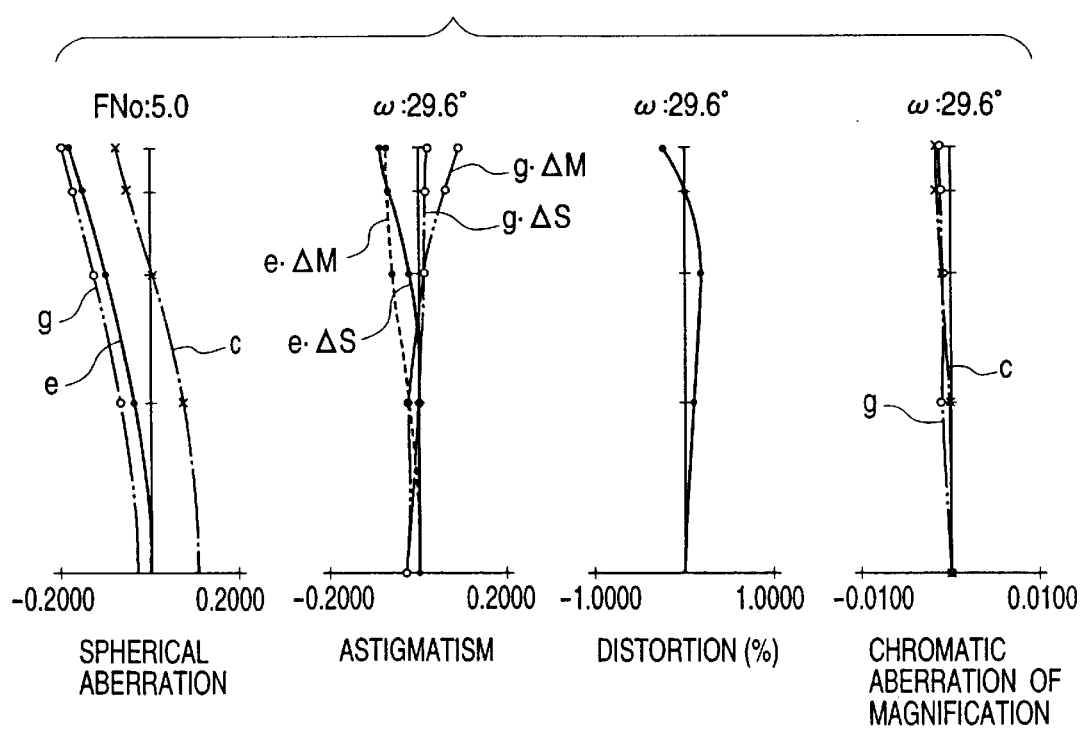
FIG. 15 is a diagram to show various aberrations of Numerical Example 6 of the present invention.
Figure 16:
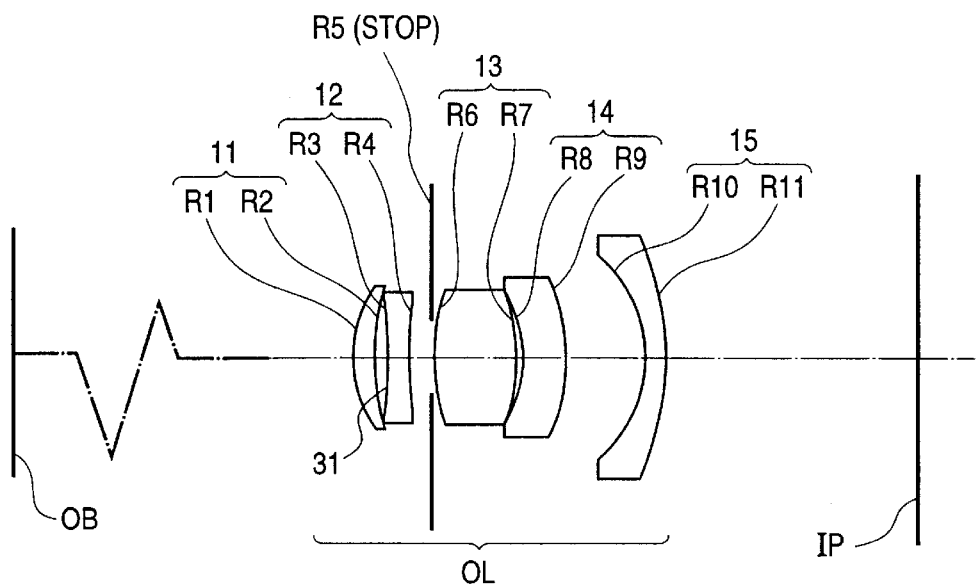
FIG. 16 is a lens sectional view of Numerical Example 7 of the present invention.

In Numerical Example 6 the various aberrations are well corrected both in the meridional image surface and in the sagittal image surface, as illustrated in FIG. 15, and astigmatism is also suppressed well. Further, the aberrations other than the curvature of field and astigmatism are also very well corrected.

In Numerical Example 7 the free curved surface is introduced into the object-side surface R3 of the second lens 12. The second lens 12 may be formed by polishing and grinding, but, because the volume and contour thereof both are particularly smaller than those of the other lenses, it can be formed in a shorter tact time in injection molding, molding with a mold, or the like, thus realizing a lens with extremely high mass-producibility.

Figure 17:
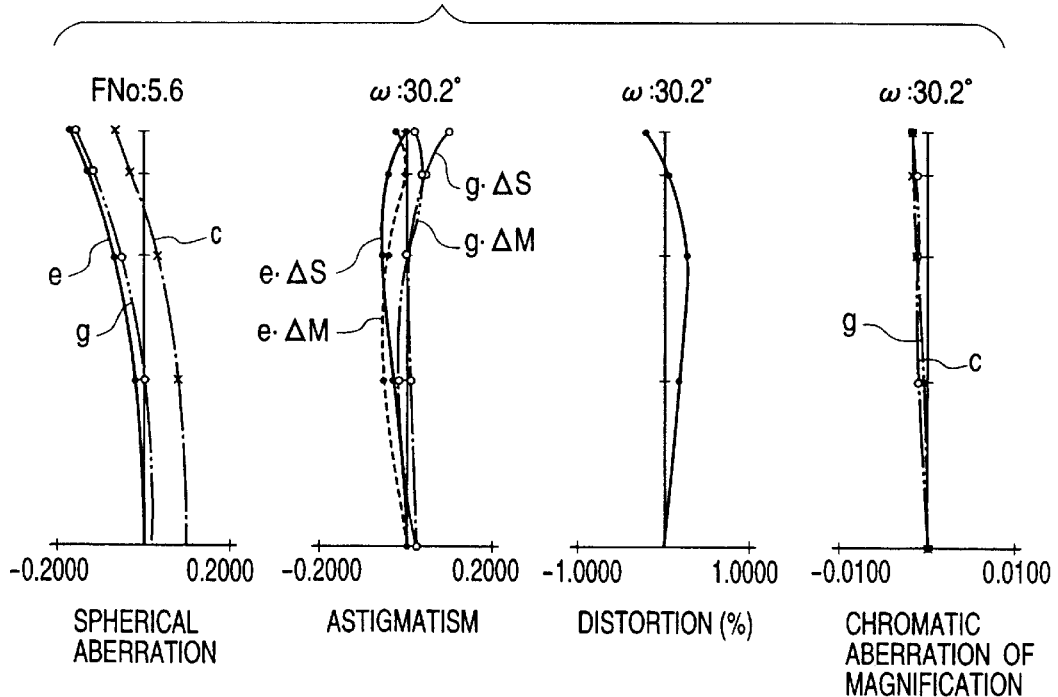
FIG. 17 is a diagram to show various aberrations of Numerical Example 7 of the present invention.
Figure 20:
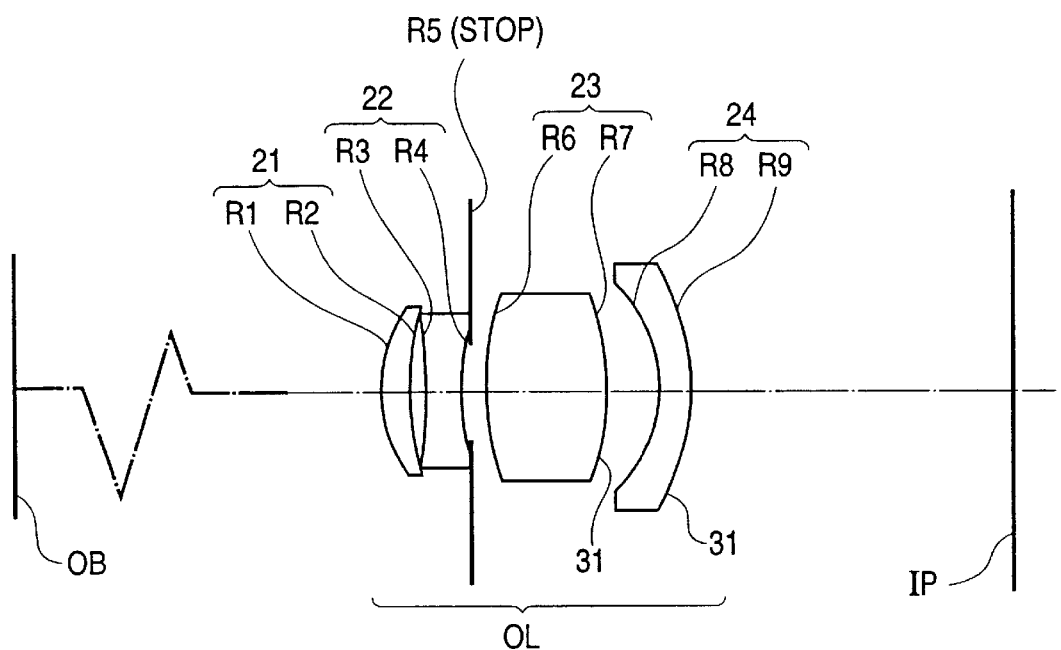
FIG. 20 is a lens sectional view of Numerical Example 9 of the present invention.

In Numerical Example 7 the various aberrations are well corrected both in the meridional image surface and in the sagittal image surface, as illustrated in FIG. 17, and astigmatism is also suppressed well. Further, the aberrations other than the curvature of field and astigmatism are also very well corrected.

In Numerical Example 8 the free curved surface is introduced into the surface R9 on the image (CCD) side of the fourth lens 24 and the rotationally symmetric, aspherical surface into the object-side surface R8. This fourth lens 24 may be formed by polishing and grinding, but it may also be formed by a method suitable for mass production, such as the press molding or injection molding, so as to permit volume production at low cost.

In Numerical Example 8 the various aberrations are well corrected both in the meridional image surface and in the sagittal image surface, as illustrated in FIG. 19, and astigmatism is also suppressed well. Further, the aberrations other than the curvature of field and astigmatism are also very well corrected.

In Numerical Example 9 the free curved surface is introduced into the surface R7 on the image (CCD) side of the third lens 23 and into the surface R9 on the image (CCD) side of the fourth lens 24. Use of the plurality of free curved surfaces permits more effective correction for curvature of field and astigmatism than in the cases of use of only one free curved surface.

These third lens 23 and fourth lens 24 may be formed by press molding, injection molding, or the like, but it is relatively easier to form them by polishing and grinding, because the other surface of either one of them is a spherical surface. For that reason they can be produced at low cost without a mold, even in the case of small-batch production. Further, since the third lens 23 is thicker particularly at the edge part than the other lenses and is thus easy to hold during grinding, the shape of the free curved surface can be realized with high accuracy.

Figure 21:
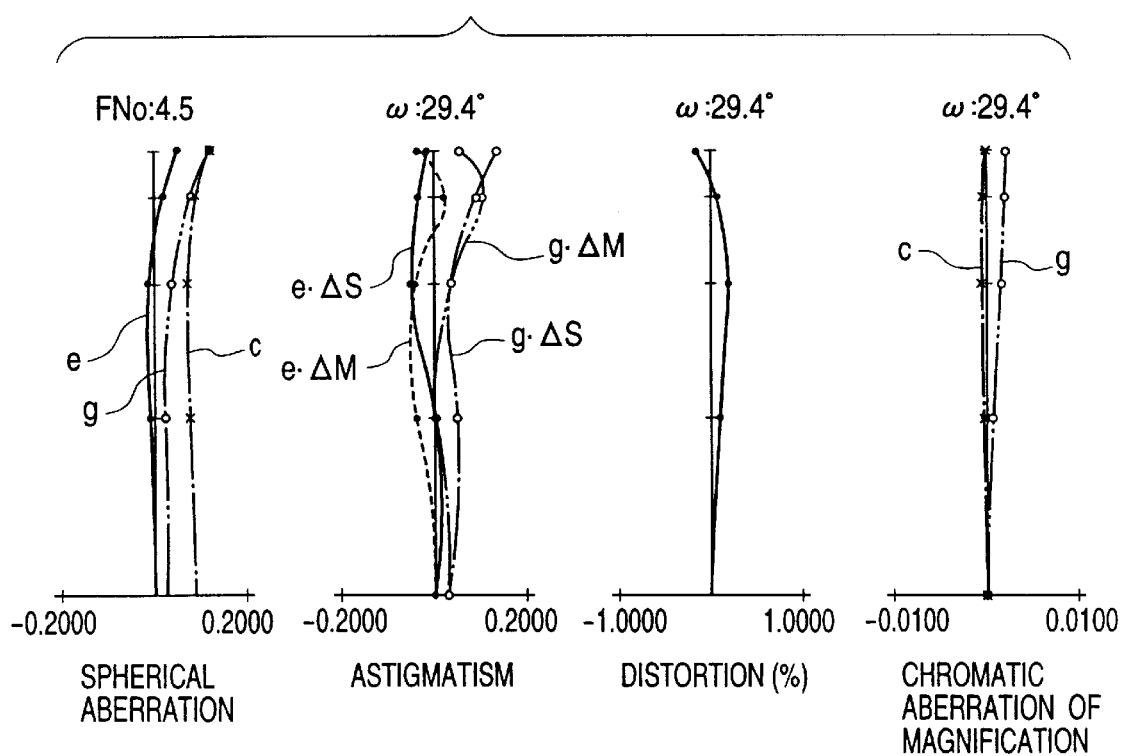
FIG. 21 is a diagram to show various aberrations of Numerical Example 9 of the present invention.
Figure 22:
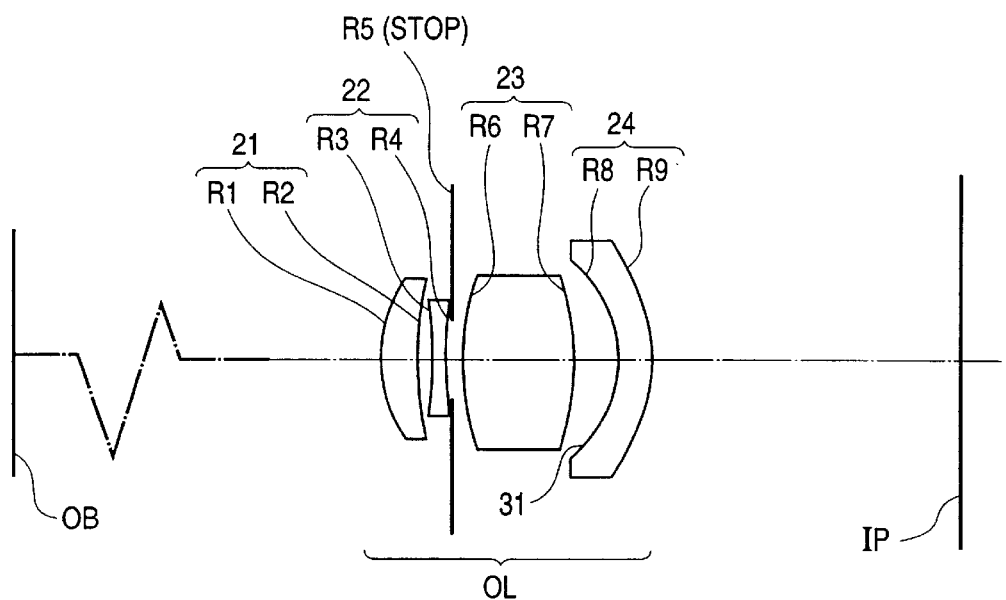
FIG. 22 is a lens sectional view of Numerical Example 10 of the present invention.

In Numerical Example 9 the various aberrations are well corrected both in the meridional image surface and in the sagittal image surface, as illustrated in FIG. 21, and astigmatism is also suppressed well. Further the aberrations other than the curvature of field and astigmatism are also well corrected.

In Numerical Example 10 the free curved surface is introduced into the object-side surface R8 of the fourth lens 24, but the other surface R9 thereof is a spherical surface. This fourth lens 24 may be formed by press molding, injection molding, or the like, but it is relatively easier to form the fourth lens 24 by polishing and grinding, because the other surface thereof is the spherical surface. For that reason the lens can be produced at low cost without a mold, even in the case of small-batch production.

Figure 23:
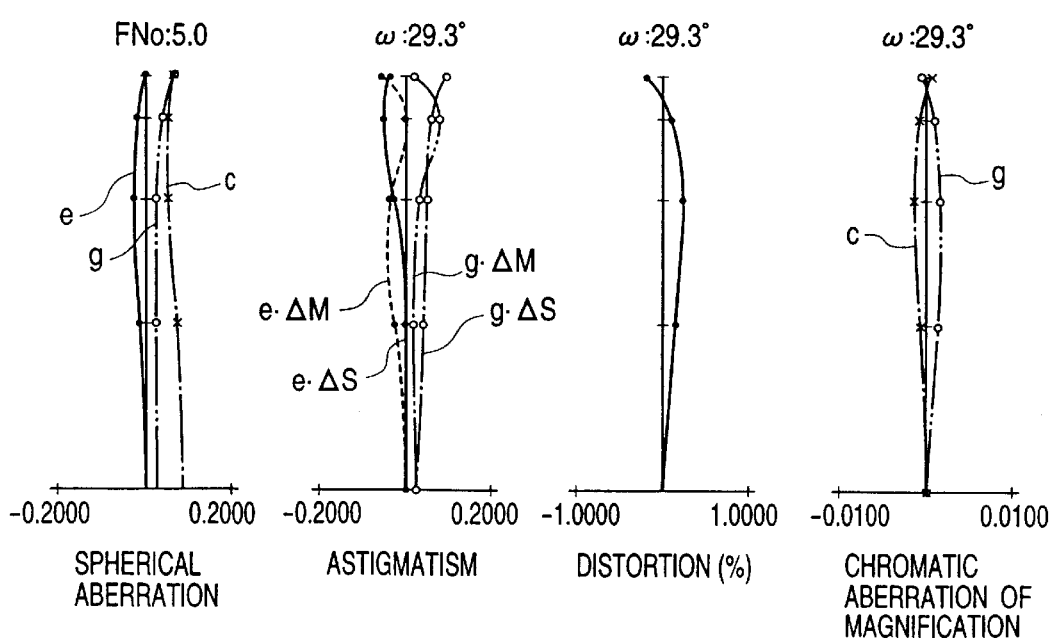
FIG. 23 is a diagram to show various aberrations of Numerical Example 10 of the present invention.
Figure 24:
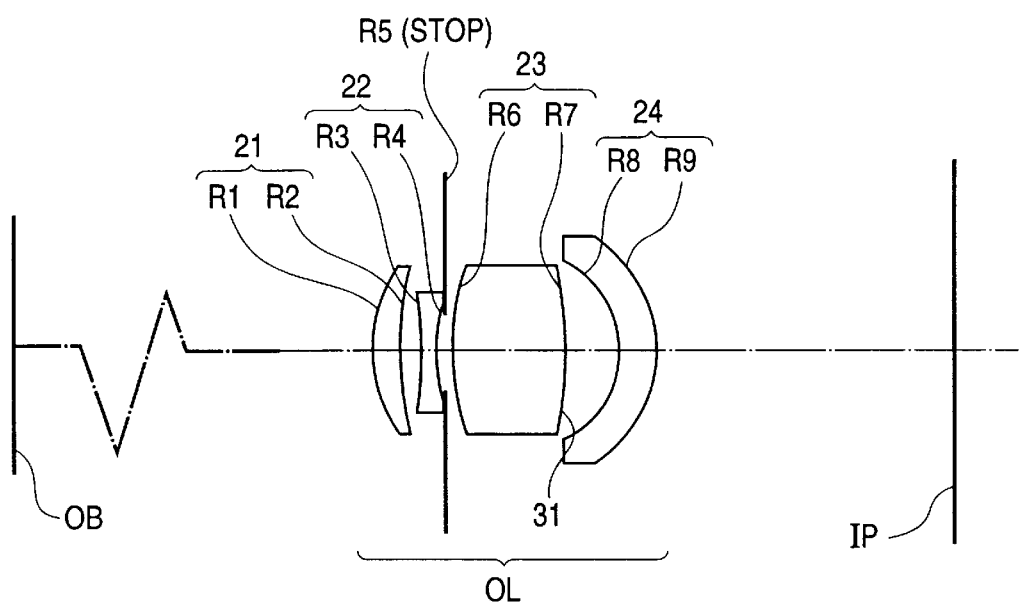
FIG. 24 is a lens sectional view of Numerical Example 11 of the present invention.

In Numerical Example 10 the various aberrations are corrected for well both in the meridional image surface and in the sagittal image surface, as illustrated in FIG. 23, and astigmatism is also suppressed well. Further, the aberrations other than the curvature of field and astigmatism are also corrected for well.

Since the number of component lenses is small, i.e. four, this structure is suitable for production at low cost.

In Numerical Example 11 the free curved surface is introduced into the image (CCD)-side surface R7 of the third lens 23. Since the third lens 23 is thicker particularly at the edge part than the other lenses and thus easy to hold during grinding, the shape of the free curved surface can be realized with high accuracy.

Figure 25:
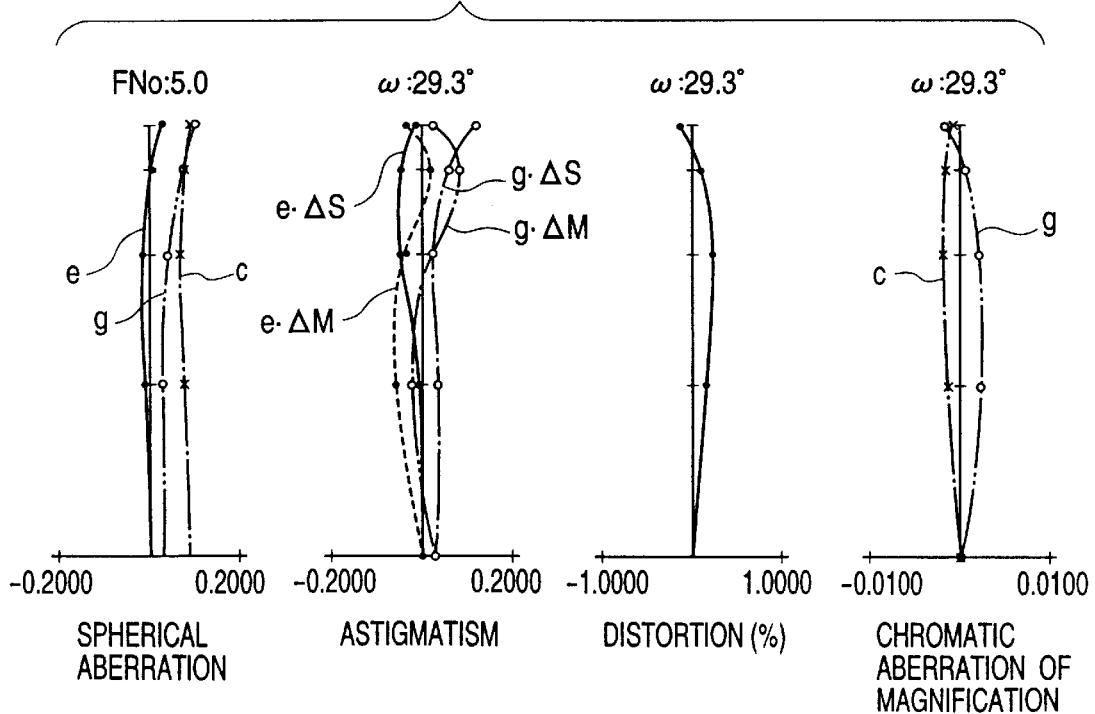
FIG. 25 is a diagram to show various aberrations of Numerical Example 11 of the present invention.
Figure 26:
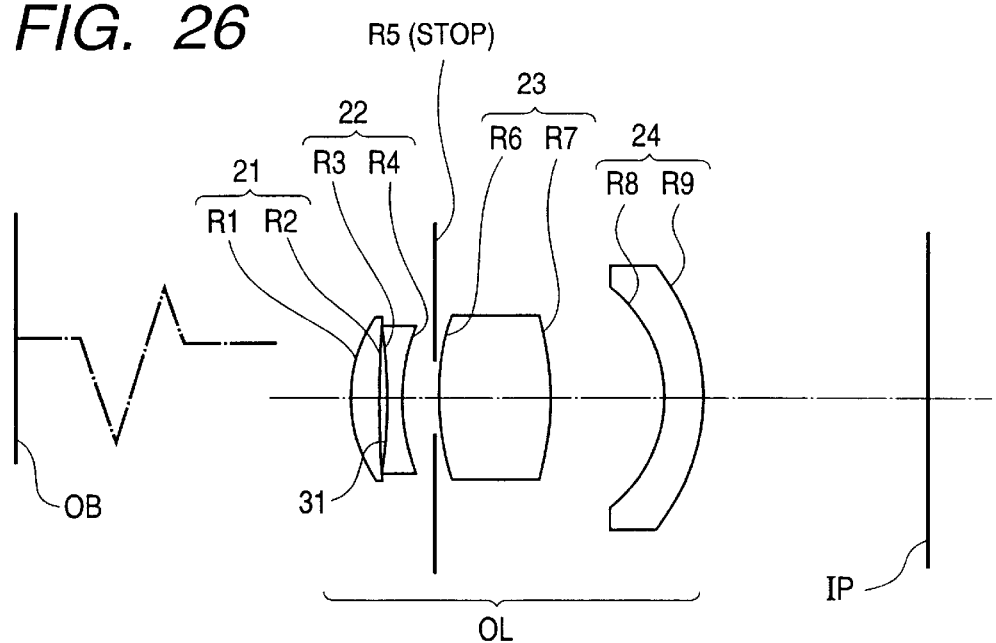
FIG. 26 is a lens sectional view of Numerical Example 12 of the present invention.

In Numerical Example 11 the various aberrations are well corrected both in the meridional image surface and in the sagittal image surface, as illustrated in FIG. 25, and astigmatism is also suppressed well. Further, the aberrations other than the curvature of field and astigmatism are also well corrected.

Since the number of component lenses is small, i.e. four, this structure is suitable for production at low cost.

In Numerical Example 12 the free curved surface is introduced into the object-side surface R3 of the second lens 22. Since the second lens 22 has the particularly smaller volume and contour than the other lenses, it can be formed in a shorter tact time in injection molding, molding with a mold, or the like, thus realizing the lens with extremely high mass-producibility.

Figure 27:
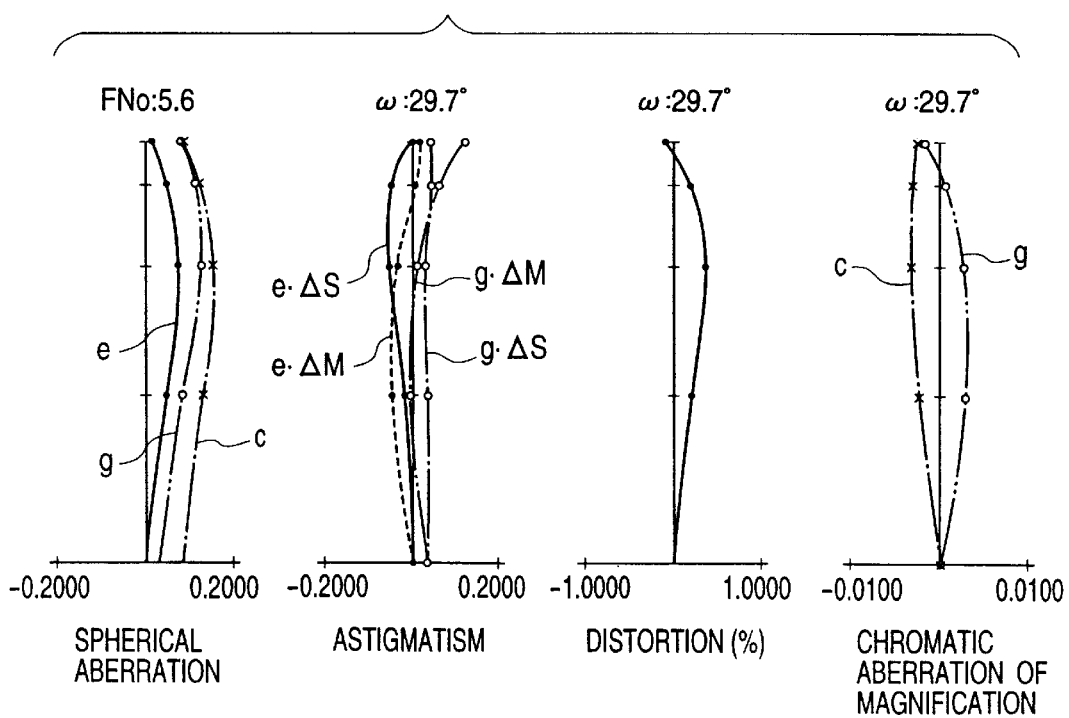
FIG. 27 is a diagram to show various aberrations of Numerical Example 12 of the present invention.

In Numerical Example 12 the various aberrations are well corrected both in the meridional image surface and in the sagittal image surface, as illustrated in FIG. 27, and astigmatism is also suppressed well. Further, the aberrations other than the curvature of field and astigmatism are also well corrected.

Since the number of component lenses is small, i.e. four, this structure is suitable for production at low cost.

In Numerical Examples 1, and 4 to 12 the radius R of curvature of the generating line of the free curved surface 31 is equal to the radius r of curvature of the meridian line on the optical axis, but they do not always have to be equal.

Next described below are Eqs. (1), (2), (3) for expressing the shapes of the free curved surfaces described above, the phase polynomial (4) for the diffracting optical element, and Eq. (5) for expressing the rotationally symmetric, aspherical surface.

The shapes of the free curved surfaces are defined as follows. In such a coordinate system that the origin lies at an intersecting point between the lens surface of the imaging lens and the optical axis, the x-axis along the optical-axis direction, the y-axis along an axis perpendicular to the optical axis in the main scanning section, and the z-axis along an axis perpendicular to the optical axis in the sub scanning section, the generating line shape X is expressed by the following equation:

$$X=(y^2/R)/[1+\{1-(1+k_y)(y/R)^2\}^{1/2}]+B_4y^4+B_6y^6+B_8y^8+B_{10}y^{10} \quad (1)$$

where

R is the radius of curvature, and $k_y$, $B_4$, $B_6$, $B_8$, and $B_{10}$ are free curved surface coefficients.

The meridian line shape S is expressed by the following equation, as a curve having the center of curvature of a radius r' in the xy plane, where a cross section is a plane perpendicular to the generating line thereon:

$$S=(z^2/r')/[1+\{1-(z/r')^2\}^{1/2}] \quad (2)$$

where $$r'=r_0(1+D_2y^2+D_4y^4+D_6y^6+D_8y^8+D_{10}y^{10})$$

where $r_0$ is the radius of curvature of the meridian line on the optical axis, $R=r_0$, and $D_2$, $D_4$, $D_6$, $D_8$, $D_{10}$ are free curved surface coefficients.

It is also expressed by the following equation:

$$S=(z^2/r)/[1+\{1-(1+k_z)(z/r)^2\}^{1/2}]+D_4z^4+D_6z^6 \quad (3)$$

where

R is the radius of curvature of the meridian line, and $k_z$, $D_4$, $D_6$ are free curved surface coefficients.

The diffraction surface of the diffracting optical element is expressed by the following equation:

$$\phi=(2\pi/\lambda)\{C_1z^2+C_2z^4+C_3z^6+y^2(D_1+D_2z^2+D_3z^4)\} \quad (4)$$

where

φ is a phase function;

λ is a reference wavelength;

z is the height from the optical axis of lens; and $C_1$, $C_2$, $C_3$, $D_1$, $D_2$, $D_3$ are phase coefficients.

The aspherical surfaces are expressed by the following equation:

$$X=(y^2/R)/[1+\{1-(1+k_y)(y/R)^2\}^{1/2}]+B_4y^4+B_6y^6+B_8y^8+B_{10}y^{10} \quad (5)$$

where

R is the radius of curvature; and $k_y$, $B_4$, $B_6$, $B_8$, $B_{10}$ are aspherical coefficients.

Each of above Numerical Examples 1 to 12 is constructed by adding the member of the rotationally asymmetric shape with respect to the optical axis or the diffracting optical element or the like to the glass surface, but methods for producing them are not limited to the grinding, injection molding, molding with a mold, and so on. The aforementioned effect can also be accomplished by the replica method with some design change. The lens types are not limited to those in the respective numerical examples described hereinafter, either. Astigmatism and curvature of field can be corrected for well even in the case of introduction to any type.

When either of the imaging lenses described above is applied to the image reading apparatus, for example, in the image scanner, the copier, or the like the whole apparatus can be constructed in compact structure.

Figure 30:
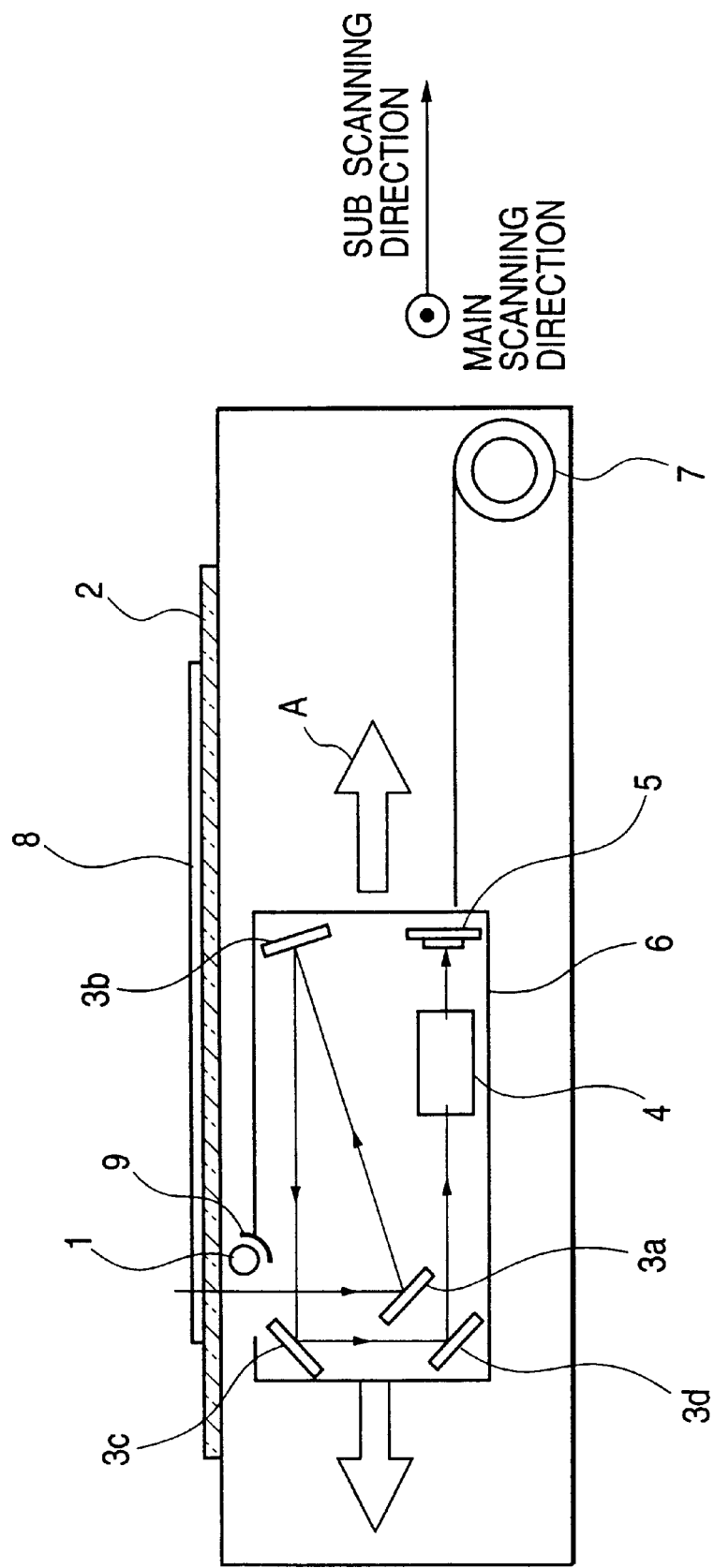
FIG. 30 is a schematic diagram to show a major part of an application of the imaging lens of the present invention to the image reading apparatus.

FIG. 30 is a schematic diagram to show the major art of an application of the imaging lens of the present invention to the image reading apparatus of the image scanner, the copier, or the like.

In FIG. 30 numeral 2 designates an original glass plate and an original 8 is mounted on a surface thereof. Numeral 6 denotes a carriage, which integrally houses an illumination light source, a reflector, a plurality of reflecting mirrors, the imaging lens, the reading means, etc. described hereinafter. The carriage 6 is moved in the sub scanning direction (in the direction of an arrow A in FIG. 30) by a driving device such as a sub scanning motor or the like, so as to read image information of the original 8. Numeral 1 represents the illumination light source, which is, for example, a fluorescent lamp, a halogen lamp, or the like. Numeral 9 indicates the reflector, which reflects light from the illumination light source 1 to illuminate the original 8 efficiently. Symbols 3a, 3b, 3c, 3d represent first, second, third, and fourth reflecting mirrors, respectively, which bend the optical path of the light from the original 8 inside the carriage 6. Numeral 4 denotes the imaging lens according to the present invention, which has either of the lens configurations described above and which focuses the light based on the image information of the original 8, on the surface of the reading means 5. Numeral 5 denotes the linear image sensor (CCD) as the reading means.

In FIG. 30 the light emitted from the illumination light source 1 illuminates the original 8 directly or via the reflector 9, and the reflected light from the original 8 is guided via the first, second, third, and fourth reflecting mirrors 3a, 3b, 3c, 3d to bend the optical path of the light inside the carriage 6 and form an image on the surface of CCD 5 through the imaging lens 4. Then the carriage 6 is moved in the direction of the arrow A (in the sub scanning direction) by the sub scanning motor 7, thereby reading the image information of the original 8.

Numerical Examples 1 to 12 of the present invention will be described below. In Numerical Examples 1 to 12 Ri represents the radius of curvature of the i-th lens surface when counted in order from the object side, Di represents a thickness of the i-th lens from the object side, or an air gap, and Ni and vi represent the refractive index and Abbe's number, respectively, of the material of the i-th lens when counted in order from the object side. The coefficients of the phase polynomial are given for the diffracting optical element, the free curved surface coefficients for the free curved surfaces, and the aspherical coefficients for the rotationally symmetric, aspherical surface. Letter A is a value indicating the relation between the aforementioned condition equation (a) and various numerals in the numerical examples.

Each of Numerical Examples 1, and 4 to 12 listed below satisfies the aforementioned condition equation (a).

NUMERICAL EXAMPLE 1

| fe = 30.59 mm | FNo = 1:5.0 | 2ω = 60.0° | m = −0.18898 |
|---|---|---|---|
| R1 = 16.201 | D1 = 1.87 | N1 = 1.772 | v1 = 49.6 |
| R2 = 35.993 | D2 = 1.26 | | |
| R3 = −46.836 | D3 = 2.30 | N2 = 1.640 | v2 = 34.5 |
| R4 = 22.827 | D4 = 3.14 | | |
| R5 = (stop) | D5 = 0 | | |
| R6 = 18.418 | D6 = 6.27 | N3 = 1.772 | v3 = 49.6 |
| R7 = −19.587 | D7 = 0.35 | | |
| R8 = −13.708 | D8 = 5.74 | N4 = 1.847 | v4 = 23.8 |
| R9 = −18.096 | D9 = 7.31 | | |
| R10 = −11.562 | D10 = 1.00 | N5 = 1.699 | v5 = 30.1 |
| R11 = −26.668 | | | |

Coefficients of the Free Curved Surface
R10=−11.562

| $k_y = 3.680 \times 10^{-1}$ | $B_4 = -4.154 \times 10^{-6}$ | $B_6 = 5.351 \times 10^{-8}$ |
|---|---|---|
| $B_8 = 0.000 \times 10^{-0}$ | $B_{10} = 0.000 \times 10^{-0}$ | |
| $D_2 = -2.630 \times 10^{-3}$ | $D_4 = 2.820 \times 10^{-5}$ | $D_6 = -2.267 \times 10^{-7}$ |
| $D_8 = 0.000 \times 10^{-0}$ | $D_{10} = 0.000 \times 10^{-0}$ | |
| A = 0.022 | | |

NUMERICAL EXAMPLE 2

| fe = 30.60 mm (meridional), 30.71 mm (sagittal) | | | |
|---|---|---|---|
| | FNo = 1:5.0 | 2ω = 60.0° | m = −0.18898 |
| R1 = 15.247 | D1 = 1.89 | N1 = 1.772 | v1 = 49.6 |
| R2 = 31.433 | D2 = 0.866 | | |
| R3 = −51.163 | D3 = 3.00 | N2 = 1.640 | v2 = 34.5 |
| R4 = 19.643 | D4 = 1.33 | | |
| R5 = (stop) | D5 = 0 | | |
| R6 = 16.826 | D6 = 6.27 | N3 = 1.772 | v3 = 49.6 |
| R7 = −19.058 | D7 = 0.39 | | |
| R8 = −12.332 | D8 = 6.00 | N4 = 1.847 | v4 = 23.8 |
| R9 = −15.738 | D9 = 7.51 | | |
| R10 = −9.264 | D10 = 1.00 | N5 = 1.699 | v5 = 30.1 |
| R11 = −19.041 | | | |

*R10 is of the meridional shape.

Coefficients of the Free Curved Surface

| R10 = −9.264 | | |
|---|---|---|
| $k_y = -4.234 \times 10^{-2}$ | $B_4 = -3.465 \times 10^{-6}$ | $B_6 = 8.394 \times 10^{-8}$ |
| $B_8 = 0.000 \times 10^{-0}$ | $B_{10} = 0.000 \times 10^{-0}$ | |
| r10 = −9.227 | | |
| $k_z = -7.526 \times 10^{-1}$ | $D_4 = -4.447 \times 10^{-5}$ | $D_6 = 4.110 \times 10^{-6}$ |
| $D_8 = 0.000 \times 10^{-0}$ | $D_{10} = 0.000 \times 10^{-0}$ | |

NUMERICAL EXAMPLE 3

| fe = 30.60 mm | FNo = 1:5.0 | 2ω = 60.0° | m = −0.18898 |
|---|---|---|---|
| R1 = 15.123 | D1 = 1.59 | N1 = 1.772 | v1 = 49.6 |
| R2 = 25.112 | D2 = 1.79 | | |
| R3 = −41.869 | D3 = 2.30 | N2 = 1.640 | v2 = 34.5 |
| R4 = 26.614 | D4 = 1.44 | | |
| R5 = (stop) | D5 = 0 | | |
| R6 = 15.309 | D6 = 5.52 | N3 = 1.772 | v3 = 49.6 |
| R7 = −19.493 | D7 = 0.333 | | |
| R8 = −12.431 | D8 = 6.00 | N4 = 1.847 | v4 = 23.8 |
| R9 = −16.018 | D9 = 6.99 | | |
| R10 = −8.595 | D10 = 1.19 | N5 = 1.699 | v5 = 30.1 |
| R11 = −17.365 | | | |

Phase difference coefficients of the diffracting optical element added on the R10 surface (at the reference wavelength of λ=546 mm)
R10=−8.595
$C_1 = -4.072 \times 10^{-5}$ $C_2 = 4.186 \times 10^{-5}$ $C_3 = 1.637 \times 10^{-6}$
$D_1 = -4.072 \times 10^{-5}$ $D_2 = -1.822 \times 10^{-5}$ $D_3 = -2.993 \times 10^{-6}$

NUMERICAL EXAMPLE 4

| fe = 28.61 mm | FNo = 1:3.5 | 2ω = 57.7° | m = −0.16535 |
|---|---|---|---|
| R1 = 10.811 | D1 = 2.47 | N1 = 1.697 | v1 = 55.5 |
| R2 = 15.585 | D2 = 1.39 | | |
| R3 = −37.827 | D3 = 2.34 | N2 = 1.689 | v2 = 31.1 |
| R4 = 52.488 | D4 = 0.89 | | |
| R5 = (stop) | D5 = 0.33 | | |
| R6 = 18.157 | D6 = 6.96 | N3 = 1.788 | v3 = 47.4 |
| R7 = −20.463 | D7 = 0.71 | | |
| R8 = −11.608 | D8 = 2.76 | N4 = 1.847 | v4 = 23.8 |
| R9 = −16.636 | D9 = 3.89 | | |
| R10 = −10.263 | D10 = 2.13 | N5 = 1.603 | v5 = 38.0 |
| R11 = −16.271 | | | |

Coefficients of the Free Curved Surfaces

| R10 = −10.263 | | |
|---|---|---|
| $k_y = -1.076 \times 10^{-2}$ | $B_4 = 2.822 \times 10^{-5}$ | $B_6 = -1.898 \times 10^{-7}$ |
| $B_8 = -1.436 \times 10^{-9}$ | $B_{10} = 0.000 \times 10^{-0}$ | |
| $D_2 = 1.547 \times 10^{-3}$ | $D_4 = -2.931 \times 10^{-5}$ | $D_6 = -4.305 \times 10^{-7}$ |
| $D_8 = 2.903 \times 10^{-8}$ | $D_{10} = 0.000 \times 10^{-0}$ | |
| A = 0.019 | | |

| R11 = −16.271 | | |
|---|---|---|
| $k_y = -4.003 \times 10^{-0}$ | $B_4 = -5.314 \times 10^{-5}$ | $B_6 = 6.442 \times 10^{-7}$ |
| $B_8 = -4.289 \times 10^{-9}$ | $B_{10} = 1.971 \times 10^{-11}$ | |
| $D_2 = 7.122 \times 10^{-3}$ | $D_4 = 2.006 \times 10^{-5}$ | $D_6 = -3.860 \times 10^{-7}$ |
| $D_8 = -7.017 \times 10^{-9}$ | $D_{10} = 4.436 \times 10^{-10}$ | |
| A = 0.038 | | |

NUMERICAL EXAMPLE 5

| fe = 31.51 mm | FNo = 1:5.0 | 2ω = 58.5° | m = −0.18898 |
|---|---|---|---|
| R1 = 11.557 | D1 = 3.58 | N1 = 1.652 | v1 = 58.6 |
| R2 = 18.751 | D2 = 0.72 | | |
| R3 = −27.236 | D3 = 1.50 | N2 = 1.720 | v2 = 34.7 |
| R4 = 40.601 | D4 = 0.19 | | |
| R5 = (stop) | D5 = 0.71 | | |

-continued

| | | | |
|---|---|---|---|
| R6 = 23.600 | D6 = 2.40 | N3 = 1.755 | v3 = 52.3 |
| R7 = −17.223 | D7 = 0.27 | | |
| R8 = −13.331 | D8 = 2.97 | N4 = 1.755 | v4 = 27.5 |
| R9 = −16.817 | D9 = 5.68 | | |
| R10 = −8.033 | D10 = 1.00 | N5 = 1.648 | v5 = 33.8 |
| R11 = −10.513 | | | |

Coefficients of the Free Curved Surface

| | | |
|---|---|---|
| R11 = −10.513 | | |
| $k_y = -4.959 \times 10^{-1}$ | $B_4 = -2.480 \times 10^{-5}$ | $B_6 = -1.387 \times 10^{-7}$ |
| $B_8 = 3.712 \times 10^{-10}$ | $B_{10} = 0.000 \times 10^{-0}$ | |
| $D_2 = 2.498 \times 10^{-3}$ | $D_4 = -4.550 \times 10^{-6}$ | $D_6 = -2.798 \times 10^{-7}$ |
| $D_8 = 1.576 \times 10^{-9}$ | $D_{10} = 0.000 \times 10^{-0}$ | |
| A = 0.028 | | |

NUMERICAL EXAMPLE 6

| | | | |
|---|---|---|---|
| fe = 31.00 mm | FNo = 1:5.0 | 2ω = 59.3° | m = −0.18898 |
| R1 = 11.079 | D1 = 2.89 | N1 = 1.729 | v1 = 54.7 |
| R2 = 18.964 | D2 = 0.77 | | |
| R3 = −54.855 | D3 = 1.80 | N2 = 1.785 | v2 = 26.3 |
| R4 = 50.721 | D4 = 1.10 | | |
| R5 = (stop) | D5 = 0.32 | | |
| R6 = 23.565 | D6 = 6.06 | N3 = 1.788 | v3 = 47.4 |
| R7 = −28.169 | D7 = 0.55 | | |
| R8 = −13.751 | D8 = 3.62 | N4 = 1.762 | v4 = 26.5 |
| R9 = −12.906 | D9 = 2.76 | | |
| R10 = −8.564 | D10 = 1.81 | N5 = 1.689 | v5 = 31.1 |
| R11 = −18.688 | | | |

Coefficients of the Free Curved Surface

| | | |
|---|---|---|
| R9 = −12.906 | | |
| $k_y = -8.075 \times 10^{-2}$ | $B_4 = 1.393 \times 10^{-5}$ | $B_6 = -1.810 \times 10^{-7}$ |
| $B_8 = 4.361 \times 10^{-9}$ | $B_{10} = -4.813 \times 10^{-11}$ | |
| $D_2 = 2.875 \times 10^{-3}$ | $D_4 = -3.622 \times 10^{-5}$ | $D_6 = -1.274 \times 10^{-6}$ |
| $D_8 = 1.866 \times 10^{-8}$ | $D_{10} = 4.040 \times 10^{-11}$ | |
| A = 0.052 | | |

NUMERICAL EXAMPLE 7

| | | | |
|---|---|---|---|
| fe = 30.34 mm | FNo = 1:5.6 | 2ω = 60.4° | m = −0.18898 |
| R1 = 11.551 | D1 = 1.54 | N1 = 1.729 | v1 = 54.7 |
| R2 = 22.296 | D2 = 0.81 | | |
| R3 = −35.874 | D3 = 1.75 | N2 = 1.689 | v2 = 31.1 |
| R4 = 24.514 | D4 = 1.71 | | |
| R5 = (stop) | D5 = 0.27 | | |
| R6 = 18.113 | D6 = 5.72 | N3 = 1.772 | v3 = 49.6 |
| R7 = −18.293 | D7 = 0.59 | | |
| R8 = −10.575 | D8 = 3.46 | N4 = 1.755 | v4 = 27.5 |
| R9 = −12.413 | D9 = 6.10 | | |
| R10 = −8.350 | D10 = 1.07 | N5 = 1.603 | v5 = 38.0 |
| R11 = −24.380 | | | |

Coefficients of the Free Curved Surface

| | | |
|---|---|---|
| R3 = −35.874 | | |
| $k_y = 3.625 \times 10^{-0}$ | $B_4 = -6.438 \times 10^{-6}$ | $B_6 = 1.300 \times 10^{-6}$ |

| | | |
|---|---|---|
| $B_8 = -4.079 \times 10^{-8}$ | $B_{10} = 8.179 \times 10^{-11}$ | |
| $D_2 = -6.969 \times 10^{-3}$ | $D_4 = 4.244 \times 10^{-3}$ | $D_6 = -7.945 \times 10^{-4}$ |
| $D_8 = 6.332 \times 10^{-5}$ | $D_{10} = -1.803 \times 10^{-6}$ | |
| A = 0.031 | | |

NUMERICAL EXAMPLE 8

| | | | |
|---|---|---|---|
| fe = 28.94 mm | FNo = 1:5.0 | 2ω = 57.1° | m = −0.16535 |
| R1 = 9.798 | D1 = 1.80 | N1 = 1.772 | v1 = 49.6 |
| R2 = 32.531 | D2 = 1.43 | | |
| R3 = −83.772 | D3 = 1.00 | N2 = 1.722 | v2 = 29.2 |
| R4 = 11.750 | D4 = 0.66 | | |
| R5 = (stop) | D5 = 0.95 | | |
| R6 = 24.462 | D6 = 6.66 | N3 = 1.772 | v3 = 49.6 |
| R7 = −33.061 | D7 = 4.90 | | |
| R8 = −6.566 | D8 = 1.14 | N4 = 1.530 | v4 = 55.5 |
| R9 = −8.085 | | | |

Coefficients of the Rotationally Symmetric, Aspherical Surface

| | | |
|---|---|---|
| R8 = −6.566 | | |
| $k_y = -2.160 \times 10^{-1}$ | $B_4 = -9.555 \times 10^{-5}$ | $B_6 = -1.765 \times 10^{-6}$ |
| $B_8 = 3.462 \times 10^{-8}$ | $B_{10} = -1.765 \times 10^{-6}$ | |

Coefficients of the Free Curved Surface

| | | |
|---|---|---|
| R9 = −8.085 | | |
| $k_y = -1.379 \times 10^{-1}$ | $B_4 = -2.592 \times 10^{-5}$ | $B_6 = -1.313 \times 10^{-7}$ |
| $B_8 = 7.835 \times 10^{-9}$ | $B_{10} = 1.952 \times 10^{-10}$ | |
| $D_2 = 1.602 \times 10^{-3}$ | $D_4 = -4.808 \times 10^{-5}$ | $D_6 = 2.895 \times 10^{-6}$ |
| $D_8 = -6.418 \times 10^{-8}$ | $D_{10} = 4.471 \times 10^{-10}$ | |
| A = 0.029 | | |

NUMERICAL EXAMPLE 9

| | | | |
|---|---|---|---|
| fe = 31.29 mm | FNo = 1:4.5 | 2ω = 58.8° | m = −0.18898 |
| R1 = 11.379 | D1 = 1.94 | N1 = 1.697 | v1 = 55.5 |
| R2 = 29.171 | D2 = 1.02 | | |
| R3 = −54.162 | D3 = 2.56 | N2 = 1.699 | v2 = 30.1 |
| R4 = 18.311 | D4 = 0.79 | | |
| R5 = (stop) | D5 = 0.77 | | |
| R6 = 18.884 | D6 = 8.13 | N3 = 1.786 | v3 = 44.2 |
| R7 = −31.726 | D7 = 3.98 | | |
| R8 = −9.155 | D8 = 2.37 | N4 = 1.699 | v4 = 30.1 |
| R9 = −14.823 | | | |

Coefficients of the Free Curved Surfaces

| | | |
|---|---|---|
| R7 = −31.726 | | |
| $k_y = 4.445 \times 10^{-1}$ | $B_4 = 2.456 \times 10^{-6}$ | $B_6 = 6.119 \times 10^{-8}$ |
| $B_8 = 0.000 \times 10^{-0}$ | $B_{10} = 0.000 \times 10^{-0}$ | |
| $D_2 = -1.507 \times 10^{-3}$ | $D_4 = 9.764 \times 10^{-5}$ | $D_6 = -3.676 \times 10^{-6}$ |
| $D_8 = 0.000 \times 10^{-0}$ | $D_{10} = 0.000 \times 10^{-0}$ | |
| A = 0.010 | | |
| R9 = −14.823 | | |
| $k_y = -5.160 \times 10^{-2}$ | $B_4 = 3.195 \times 10^{-5}$ | $B_6 = 8.106 \times 10^{-8}$ |
| $B_8 = 2.901 \times 10^{-9}$ | $B_{10} = -1.453 \times 10^{-11}$ | |
| $D_2 = 4.487 \times 10^{-3}$ | $D_4 = -1.035 \times 10^{-4}$ | $D_6 = 6.323 \times 10^{-6}$ |

-continued $D_8 = -1.565 \times 10^{-7}$  $D_{10} = 1.388 \times 10^{-9}$
$A = 0.131$

NUMERICAL EXAMPLE 10

| | | | |
|---|---|---|---|
| fe = 31.41 mm | FNo = 1:5.0 | 2ω = 58.6° | m = −0.18898 |
| R1 = 10.643 | D1 = 2.97 | N1 = 1.697 | ν1 = 55.8 |
| R2 = 27.483 | D2 = 0.98 | | |
| R3 = −56.028 | D3 = 1.02 | N2 = 1.699 | ν2 = 30.1 |
| R4 = 16.202 | D4 = 0.76 | | |
| R5 = (stop) | D5 = 0.64 | | |
| R6 = 21.001 | D6 = 7.98 | N3 = 1.786 | ν3 = 44.2 |
| R7 = −28.833 | D7 = 3.53 | | |
| R8 = −8.800 | D8 = 2.40 | N4 = 1.689 | ν4 = 31.1 |
| R9 = −13.655 | | | |

Coefficients of the Free Curved Surface $R8 = -8.800$
$k_y = 3.384 \times 10^{-2}$  $B_4 = -4.253 \times 10^{-5}$  $B_6 = -3.644 \times 10^{-7}$
$B_8 = -7.350 \times 10^{-9}$  $B_{10} = -1.898 \times 10^{-10}$
$D_2 = -3.132 \times 10^{-3}$  $D_4 = 3.611 \times 10^{-5}$  $D_6 = 1.896 \times 10^{-7}$
$D_8 = 1.458 \times 10^{-8}$  $D_{10} = -4.639 \times 10^{-10}$
$A = 0.002$

NUMERICAL EXAMPLE 11

| | | | |
|---|---|---|---|
| fe = 31.50 mm | FNo = 1:5.0 | 2ω = 58.5° | m = −0.18898 |
| R1 = 9.567 | D1 = 1.99 | N1 = 1.697 | ν1 = 55.5 |
| R2 = 23.970 | D2 = 1.55 | | |
| R3 = −66.875 | D3 = 1.00 | N2 = 1.699 | ν2 = 30.1 |
| R4 = 14.302 | D4 = 0.76 | | |
| R5 = (stop) | D5 = 0.35 | | |
| R6 = 18.337 | D6 = 7.82 | N3 = 1.786 | ν3 = 44.2 |
| R7 = −37.678 | D7 = 4.03 | | |
| R8 = −6.795 | D8 = 2.41 | N4 = 1.689 | ν4 = 31.1 |
| R9 = −9.833 | | | |

Coefficients of the Free Curved Surface $R7 = -37.678$
$k_y = -3.513$  $B_4 = 1.655 \times 10^{-5}$  $B_6 = -8.545 \times 10^{-8}$
$B_8 = 6.197 \times 10^{-9}$  $B_{10} = -2.420 \times 10^{-10}$
$D_2 = 1.191 \times 10^{-2}$  $D_4 = -6.775 \times 10^{-4}$  $D_6 = 1.404 \times 10^{-5}$
$D_8 = 2.111 \times 10^{-7}$  $D_{10} = -1.027 \times 10^{-8}$
$A = 0.006$

NUMERICAL EXAMPLE 12

| | | | |
|---|---|---|---|
| fe = 30.97 mm | FNo = 1:5.6 | 2ω = 59.3° | m = −0.18898 |
| R1 = 11.348 | D1 = 2.02 | N1 = 1.729 | ν1 = 54.7 |
| R2 = 60.704 | D2 = 0.66 | | |
| R3 = −50.304 | D3 = 1.00 | N2 = 1.689 | ν2 = 31.1 |
| R4 = 13.832 | D4 = 2.46 | | |
| R5 = (stop) | D5 = 0.22 | | |
| R6 = 24.031 | D6 = 8.00 | N3 = 1.786 | ν3 = 44.2 |
| R7 = −31.822 | D7 = 8.80 | | |
| R8 = −9.106 | D8 = 2.63 | N4 = 1.689 | ν4 = 31.1 |
| R9 = −15.804 | | | |

Coefficients of the Free Curved Surface $R3 = -50.304$
$k_y = 3.320$  $B_4 = -3.132 \times 10^{-5}$  $B_6 = 3.390 \times 10^{-6}$
$B_8 = 1.568 \times 10^{-7}$  $B_{10} = 2.879 \times 10^{-9}$
$D_2 = -2.491 \times 10^{-2}$  $D_4 = 8.556 \times 10^{-3}$  $D_6 = -1.189 \times 10^{-3}$
$D_5 = 7.284 \times 10^{-5}$  $D_{10} = -1.603 \times 10^{-6}$
$A = 0.003$

NUMERICAL EXAMPLE A
(Prior Art Example)

| | | | |
|---|---|---|---|
| fe = 30.59 mm | FNo = 1:5.0 | 2ω = 60.0° | m = −0.18898 |
| R1 = 13.355 | D1 = 1.78 | N1 = 1.772 | ν1 = 49.6 |
| R2 = 38.957 | D2 = 0.64 | | |
| R3 = −52.772 | D3 = 1.98 | N2 = 1.640 | ν2 = 34.5 |
| R4 = 14.188 | D4 = 1.99 | | |
| R5 = (stop) | D5 = 0 | | |
| R6 = 20.000 | D6 = 4.97 | N3 = 1.772 | ν3 = 49.6 |
| R7 = −18.385 | D7 = 0.32 | | |
| R8 = −13.512 | D8 = 5.80 | N4 = 1.847 | ν4 = 23.8 |
| R9 = −17.011 | D9 = 9.33 | | |
| R10 = −10.367 | D10 = 1.57 | N5 = 1.699 | ν5 = 30.1 |
| R11 = −23.401 | | | |

The present invention can accomplish the imaging lens capable of demonstrating the sufficient imaging performance even at ultra-wide angles in a structure including a small number of lenses with good correction for curvature of field, astigmatism, etc., by providing at least one of the plural surfaces forming the imaging lens with the rotationally asymmetric refracting power with respect to the optical axis as described above, and also accomplish the image reading apparatus using it.

What is claimed is:

1. An imaging lens for use in image reading, for imaging image information of an original on a linear image sensor,
    wherein said imaging lens is formed of a plurality of surfaces having a common optical axis, and
    wherein at least one surface out of said plurality of surfaces has a refracting power rotationally asymmetric with respect to the optical axis so as to diminish aberrations arising from a predetermined angle of view formed between an off-axis principal ray and an on-axis principal ray which are reflected by said original.

2. The imaging lens according to claim 1, wherein said surface having the rotationally asymmetric refracting power is a surface of a rotationally asymmetric shape and is integral with a surface of a single lens forming said imaging lens.

3. The imaging lens according to claim 1, wherein said surface having the rotationally asymmetric refracting power is a diffracting optical element having rotationally asymmetric refracting power and is integral with a surface of a single lens forming said imaging lens.

4. The imaging lens according to claim 1, wherein said surface having the rotationally asymmetric refracting power is formed by adding a member of a rotationally asymmetric shape with respect to the optical axis to a rotationally symmetric surface.

5. The imaging lens according to claim 1, wherein said surface having the rotationally asymmetric refracting power is formed by adding a diffracting optical element having refracting power rotationally asymmetric with respect to the optical axis, to a rotationally symmetric surface.

6. The imaging lens according to any one of claims 1 to 5, said imaging lens being used in an image reading apparatus adapted to image the image information of the original illuminated by light from an illumination light source on a surface of the reading means and read the image information.

7. An imaging lens for use in image reading, for imaging image information of an original on reading means, said imaging lens having a stop in the imaging lens,
   wherein at least one surface not facing said stop, out of a plurality of surfaces forming the imaging lens, has a refracting power rotationally asymmetric with respect to the optical axis,
   wherein said plurality of surfaces have a common optical axis.

8. The imaging lens according to claim 7, wherein said surface having the rotationally asymmetric refracting power is a surface of a rotationally asymmetric shape having rotationally symmetric refracting power on the optical axis and is integral with a surface of a single lens forming said imaging lens.

9. The imaging lens for use in image reading, for imaging image information of an original on reading means,
   said imaging lens having a stop in the imaging lens,
   wherein at least one surface not facing said stop, out of a plurality of surfaces forming the imaging lens, has a refracting power rotationally asymmetric with respect to the optical axis,
   wherein said surface having the rotationally asymmetric refracting power is a surface a radius of curvature of a generating line of which is equal to a radius of curvature of a meridian line thereof on the optical axis.

10. The imaging lens for use in image reading, for imaging image information of an original on reading means,
    said imaging lens having a stop in the imaging lens,
    wherein at least one surface not facing said stop, out of a plurality of surfaces forming the imaging lens, has a refracting power rotationally asymmetric with respect to the optical axis,
    wherein said surface having the rotationally asymmetric refracting power is formed by adding a member of a rotationally asymmetric shape with respect to the optical axis to a rotationally symmetric surface.

11. The imaging lens according to any one of claims 7 to 10, said imaging lens being used in an image reading apparatus adapted to image the image information of the original illuminated by light from an illumination light source on a surface of the reading means and read the image information.

12. An imaging lens for use in image reading, for imaging image information of an original on reading means, wherein at least one surface at which an overlapping area of a range of up to 70% of a distance from a center to the outermost periphery of each of on-axis rays and outermost off-axis rays is not more than 50% of an area of a range of up to 70% of the distance from the center to the outermost periphery of the on-axis rays, out of a plurality of surfaces forming the imaging lens, has refracting power rotationally asymmetric with respect to the optical axis.

13. The imaging lens according to claim 12, wherein said surface having the rotationally asymmetric refracting power is a surface of a rotationally asymmetric shape having rotationally symmetric refracting power on the optical axis and is integral with a surface of a single lens forming said imaging lens.

14. The imaging lens according to claim 13, wherein said surface having the rotationally asymmetric refracting power is a surface a radius of curvature of a generating line of which is equal to a radius of curvature of a meridian line thereof on the optical axis.

15. The imaging lens according to claim 12, wherein said surface having the rotationally asymmetric refracting power is formed by adding a member of a rotationally asymmetric shape with respect to the optical axis to a rotationally symmetric surface.

16. The imaging lens according to any one of claims 12 to 15, said imaging lens being used in an image reading apparatus adapted to image the image information of the original illuminated by light from an illumination light source on a surface of the reading means and read the image information.

17. An imaging lens for use in image reading, for imaging image information of an original on reading means, said imaging lens comprising five lenses, which are a positive, first lens of the meniscus shape with a convex surface thereof facing the side of the original, a second lens whose lens surfaces both are concave surfaces, a third lens whose lens surfaces both are convex surfaces, a positive or negative, fourth lens of a meniscus shape with a convex surface thereof facing the side of the reading means, and a negative, fifth lens of the meniscus shape with a convex surface thereof facing the side of the reading means, arranged in the named order from the original side,
    wherein at least one surface out of a plurality of surfaces forming the imaging lens has refracting power rotationally asymmetric with respect to the optical axis.

18. The imaging lens according to claim 17, wherein said surface having the rotationally asymmetric refracting power is a surface of a rotationally asymmetric shape having rotationally symmetric refracting power on the optical axis and is integral with a surface of a single lens forming said imaging lens.

19. The imaging lens according to claim 18, wherein said surface having the rotationally asymmetric refracting power is a surface a radius of curvature of a generating line of which is equal to a radius of curvature of a meridian line thereof on the optical axis.

20. The imaging lens according to claim 17, wherein said surface having the rotationally asymmetric refracting power is formed by adding a member of a rotationally asymmetric shape with respect to the optical axis to a rotationally symmetric surface.

21. The imaging lens according to claim 17, further comprising a stop between said second lens and said third lens.

22. The imaging lens according to any one of claims 17 to 21, said imaging lens being used in an image reading apparatus adapted to image the image information of the original illuminated by light from an illumination light source on a surface of the reading means and read the image information.

23. An imaging lens for use in image reading, for imaging image information of an original on reading means, said imaging lens comprising four lenses, which are a positive, first lens of the meniscus shape with a convex surface thereof facing the side of the original, a second lens whose lens surfaces both are concave surfaces, a third lens whose lens surfaces both are convex surfaces, and a negative, fourth lens of the meniscus shape with a convex surface thereof facing the side of the reading means, arranged in the named order from the original side,
    wherein at least one surface out of a plurality of surfaces forming the imaging lens has refracting power rotationally asymmetric with respect to the optical axis.

24. The imaging lens according to claim 23, wherein said surface having the rotationally asymmetric refracting power is a surface of a rotationally asymmetric shape having rotationally symmetric refracting power on the optical axis and is integral with a surface of a single lens forming said imaging lens.

25. The imaging lens according to claim 24, wherein said surface having the rotationally asymmetric refracting power is a surface a radius of curvature of a generating line of which is equal to a radius of curvature of a meridian line thereof on the optical axis.

26. The imaging lens according to claim 23, wherein said surface having the rotationally asymmetric refracting power is formed by adding a member of a rotationally asymmetric shape with respect to the optical axis to a rotationally symmetric surface.

27. The imaging lens according to claim 23, further comprising a stop between said second lens and said third lens.

28. The imaging lens according to any one of claims 23 to 27, said imaging lens being used in an image reading apparatus adapted to image the image information of the original illuminated by light from an illumination light source on a surface of the reading means and read the image information.

29. An imaging lens for use in image reading for imaging image information of an original on reading means, wherein at least one surface out of a plurality of surfaces forming the imaging lens has refracting power rotationally asymmetric with respect to the optical axis,
wherein in such a coordinate system that an origin lies at an intersecting point of said one surface with the optical axis, x along a direction of the optical axis, y along a reading direction of the reading means, and z along a direction perpendicular to the optical-axis direction x and to the reading direction y,
letting R(y) be a radius of local curvature at a certain point in said reading direction y on an xy section of said one surface, and r(y) be a radius of local curvature in a direction perpendicular to the xy plane and normal to the shape of the xy section in the reading direction y,
the following condition is satisfied in a range of the reading direction y from 0 to a passing position y' of an outermost off-axis principal ray;

$$0 \leq |[R(y)-r(y)]/[f_d(N_d-1)]| \leq 0.15$$

where
$f_d$: focal length of the overall system of the imaging lens at the d-line; and
$N_d$: index of refraction of a lens with said one surface formed therein, at the d-line.

30. The imaging lens according to claim 29, wherein said R(y) satisfies the following condition in the range of the reading direction y from 0 to the passing position y' of the outermost off-axis principal ray:

$$0 \neq |dR(y)/dy|.$$

31. The imaging lens according to claim 29 or 30, wherein said R(y) and said r(y) are equal to each other on the optical axis.

32. The imaging lens according to claim 29, wherein said surface having the rotationally asymmetric refracting power is a surface of a rotationally asymmetric shape and is integral with a surface of a single lens forming said imaging lens.

33. The imaging lens according to claim 29, wherein said surface having the rotationally asymmetric refracting power is formed by adding a member of a rotationally asymmetric shape with respect to the optical axis to a rotationally symmetric surface.

34. The imaging lens according to claim 29, wherein said reading means is a linear image sensor.

35. The imaging lens according to any one of claims 29, 30, and 32 through 34, said imaging lens being used in an image reading apparatus adapted to image the image information of the original illuminated by light from an illumination light source on a surface of the reading means and read the image information.

36. The imaging lens according to claim 31, said imaging lens being used in an image reading apparatus adapted to image the image information of the original illuminated by light from an illumination light source on a surface of the reading means and read the image information.

37. An imaging lens for use in image reading, for imaging image information of an original on reading means,
wherein at least one surface out of a plurality of surfaces forming the imaging lens has a refracting power rotationally asymmetric with respect to the optical axis,
wherein said surface having the rotationally asymmetric refracting power is a surface a radius of curvature of a generating line of which is equal to a radius of curvature of a meridian line thereof on the optical axis.

38. The imaging lens according to claim 37, wherein the radius of curvature in the direction of the generating line varies with distance from the optical axis along the direction of the generating line.

39. The imaging lens according to claim 9, wherein the radius of curvature in the direction of the generating line varies with distance from the optical axis along the direction of the generating line.

40. The imaging lens according to claim 37, wherein the radius of curvature in the direction of the meridian line varies with distance from the optical axis along the direction of the generating line.

41. The imaging lens according to claim 9, wherein the radius of curvature in the direction of the meridian line varies with distance from the optical axis along the direction of the generating line.

42. The imaging lens according to claim 1, wherein the radius of curvature in the direction of the generating line varies with distance from the optical axis along the direction of the generating line.

43. The imaging lens according to claim 7, wherein the radius of curvature in the direction of the generating line varies with distance from the optical axis along the direction of the generating line.

44. The imaging lens according to claim 1, wherein the radius of curvature in the direction of the meridian line varies with distance from the optical axis along the direction of the generating line.

45. The imaging lens according to claim 7, wherein the radius of curvature in the direction of the meridian line varies with distance from the optical axis along the direction of the generating line.

46. An imaging reading apparatus comprising:
an image reader configured to read an image, said image reader comprising:
reading means for reading image information; and
an imaging lens configured to imaging image information on said reading means, according to any of claims 1, 3–5, 7, 9, 10, 12, 17, 23, 29, and 37.

47. The imaging lens according to claim 1, wherein said surface having the rotationally asymmetric refracting power is a surface a radius of curvature of a generating line of which is equal to a radius of curvature of a meridian line thereof on the optical axis.

48. The imaging lens according to claim 7, wherein said surface having the rotationally asymmetric refracting power is a surface a radius of curvature of a generating line of which is equal to a radius of curvature of a meridian line thereof on the optical axis.

49. The imaging lens according to claim 7, wherein said reading means is a linear image sensor.

50. The imaging lens according to claim 17, wherein said reading means is a linear image sensor.

51. The imaging lens according to claim 23, wherein said reading means is a linear image sensor.

52. An image reading apparatus for reading image information of an original, comprising a linear image sensor arranged in a main scanning direction and an imaging lens for imaging image information of an original on said linear image sensor, said original and said linear image sensor being scanned in a sub scanning direction relatively to each other, wherein said imaging lens is formed of a plurality of surfaces having a common optical axis, and wherein at least one surface out of said plurality of surfaces has a refracting power rotationally asymmetric with respect to the optical axis so as to diminish aberrations arising from a predetermined angle of view formed between an off-axis principal ray and an on-axis principal ray which are reflected by said original.

53. An image reading apparatus according to claim 52, wherein said at least one surface has radii of curvature in generating and meridian line directions which are different from each other at any position of the surface.

54. An image reading apparatus according to claim 52, wherein said at least one surface has radii of curvature in the generating and meridian line directions which are equal to each other only on the optical axis.

55. An image reading apparatus according to claim 52, wherein said at least one surface has a radius of curvature in a generating line direction which varies continuously from the on-axis position toward the outermost off-axis position.

56. An image reading apparatus according to claim 52, wherein said at least one surface has a radius of curvature in a meridian line direction which varies continuously from the on-axis position toward the outermost off-axis position.

57. An image reading apparatus for reading image information of an original, comprising a linear image sensor arranged in a main scanning direction and an imaging lens for imaging image information of an original on said linear image sensor, said original and said linear image sensor being scanned in a sub scanning direction relatively to each other, wherein said imaging lens is formed of a plurality of surfaces having a common optical axis and includes a stop, and wherein at least one surface not facing said stop, out of said plurality of surfaces, has a refracting power rotationally asymmetric with respect to the optical axis.

58. An image reading apparatus according to claim 57, wherein said at least one surface has radii of curvature in generating and meridian line directions which are different from each other at any position of the surface.

59. An image reading apparatus according to claim 57, wherein said at least one surface has radii of curvature in the generating and meridian line directions which are equal to each other only on the optical axis.

60. An image reading apparatus according to claim 57, wherein said at least one surface has a radius of curvature in a generating line direction which varies continuously from the on-axis position toward the outermost off-axis position.

61. An image reading apparatus according to claim 57, wherein said at least one surface has a radius of curvature in a meridian line direction which varies continuously from the on-axis position toward the outermost off-axis position.

62. An image reading apparatus for reading image information of an object, comprising an image sensor and an imaging lens for imaging image information of an object on said image sensor, wherein said imaging lens is formed of a plurality of surfaces having a common optical axis, and wherein at least one surface out of said plurality of surfaces has a refracting power rotationally asymmetric with respect to the optical axis so as to diminish aberrations arising from a predetermined angle of view formed between an off-axis principal ray and an on-axis principal ray which are reflected by said original.

63. An image reading apparatus according to claim 62, wherein said at least one surface has radii of curvature in generating and meridian line directions which are different from each other at any position of the surface.

64. An image reading apparatus according to claim 62, wherein said at least one surface has radii of curvature in generating and meridian line directions which are equal to each other only on the optical axis.

65. An image reading apparatus according to claim 62, wherein said at least one surface has a radius of curvature in a generating line direction which varies continuously from the on-axis position toward the outermost off-axis position.

66. An image reading apparatus according to claim 62, wherein said at least one surface has a radius of curvature in a meridian line direction which varies continuously from the on-axis position toward the outermost off-axis position.

67. An image reading apparatus for reading image information of an object, comprising an image sensor and an imaging lens for imaging image information of an object on said image sensor, wherein said imaging lens is formed of a plurality of surfaces having a common optical axis and includes a stop, and wherein at least one surface not facing said stop, out of said plurality of surfaces, has a refracting power rotationally asymmetric with respect to the optical axis.

68. An image reading apparatus according to claim 67, wherein said at least one surface has radii of curvature in generating and meridian line directions which are different from each other at any position of the surface.

69. An image reading apparatus according to claim 67, wherein said at least one surface has radii of curvature in the generating and meridian line directions which are equal to each other only on the optical axis.

70. An image reading apparatus according to claim 67, wherein said at least one surface has a radius of curvature in a generating line direction which varies continuously from the on-axis position toward the outermost off-axis position.

71. An image reading apparatus according to claim 67, wherein said at least one surface has a radius of curvature in a meridian line direction which varies continuously from the on-axis position toward the outermost off-axis position.

* * * * *

UNITED STATES PATENT AND TRADEMARK OFFICE
CERTIFICATE OF CORRECTION

PATENT NO. : 6,507,444 B2
DATED : January 14, 2003
INVENTOR(S) : Tado Hayashide et al.

It is certified that error appears in the above-identified patent and that said Letters Patent is hereby corrected as shown below:

Column 2,
Line 67, "aranged" should read -- arranged --.

Column 5,
Line 66, "major" should read -- a major --.

Column 12,
Line 11, "corrected." should read -- corrected.
    Since the number of component lenses is small, i.e. four, this structure is suitable for production at low cost. --.
Line 34, "corrected." should read -- corrected.
    Since the number of component lenses is small, i.e. four, this structure is suitable for production at low cost. --.

Column 14,
Line 6, "$B_6Y^6$" should read -- $B_6y^6$ --.
Line 27, "art" should read -- part --.

Column 21,
Lines 20 and 32, "The imaging" should read -- An imaging --.

Column 23,
Line 24, "reading" should read -- reading, --.

Signed and Sealed this

Twenty-third Day of September, 2003

JAMES E. ROGAN
*Director of the United States Patent and Trademark Office*